United States Patent
Miki

(10) Patent No.: US 8,695,451 B2
(45) Date of Patent: Apr. 15, 2014

(54) BICYCLE CONTROL DEVICE

(75) Inventor: Yoshimitsu Miki, Jurong Town (SG)

(73) Assignee: Shimano Inc., Osaka (JP)

( * ) Notice: Subject to any disclaimer, the term of this patent is extended or adjusted under 35 U.S.C. 154(b) by 1750 days.

(21) Appl. No.: 11/936,236

(22) Filed: Nov. 7, 2007

(65) Prior Publication Data

US 2009/0114051 A1    May 7, 2009

(51) Int. Cl.
*B62K 23/06* (2006.01)
*B62L 3/02* (2006.01)
*B62M 25/04* (2006.01)

(52) U.S. Cl.
USPC ........................................ 74/502.2

(58) Field of Classification Search
USPC ........................................ 74/502.2, 488, 489
IPC ................................. F16C 1/10, 1/12
See application file for complete search history.

(56) References Cited

U.S. PATENT DOCUMENTS

| | | |
|---|---|---|
| 4,532,825 A | 8/1985 | Nagano |
| 4,995,280 A | 2/1991 | Tagawa |
| 5,094,120 A | 3/1992 | Tagawa |
| 5,257,683 A | 11/1993 | Romano |
| 5,400,675 A | 3/1995 | Nagano |
| 6,155,132 A | 12/2000 | Yamane |
| 6,810,764 B2 | 11/2004 | Chen |
| 7,194,928 B2 | 3/2007 | Kawakami |

FOREIGN PATENT DOCUMENTS

| | | |
|---|---|---|
| DE | 20 2008 011 166 U1 | 10/2008 |
| EP | 1 440 878 A2 | 7/2004 |
| EP | 1 449 756 A1 | 8/2004 |
| JP | 3283289 B | 3/2002 |

*Primary Examiner* — Daniel Yabut
(74) *Attorney, Agent, or Firm* — Global IP Counselors

(57) ABSTRACT

A bicycle control device is basically provided with a base member, a control unit, an attachment member, a first operating lever and a second operating lever. The base member includes a handlebar mounting structure. The control unit is mounted to the base member. The attachment member is movably coupled to the base member. The first operating lever is operatively coupled to the control unit. The first operating lever is coupled to the attachment member to move with the attachment member when the attachment member is moved relative to the base member. The first operating lever is pivotally coupled to the attachment member to pivot relative to the attachment member about a first pivot axis to operate the control unit. The second operating lever is operatively coupled to the control unit and pivotally coupled to the attachment member.

15 Claims, 22 Drawing Sheets

BICYCLE CONTROL DEVICE

BACKGROUND OF THE INVENTION

1. Field of the Invention

This invention generally relates to a bicycle control device for operating a bicycle component. More specifically, the present invention relates to a bicycle control (component actuating) device that has a pair of operating levers for operating a control unit.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmits the operating force to a cable that is fixed at one end to the control lever and fixed at the other end to the bicycle component (e.g., derailleur or brake devices). In more recent years, shifting and braking operations are performed pneumatically or electrically.

Currently, many different types of control devices exist for performing shifting and braking operations. Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever. One example of this type of control device is disclosed in U.S. Pat. No. 5,400,675 to Nagano (assigned to Shimano, Inc). However, more typically, one or two shift levers are provided in addition to the brake lever. One example of this type of control device is disclosed in U.S. Pat. No. 5,257,683 to Romano (assigned to Campagnolo). While these types of control devices work well, it is desirable to provide a bicycle control (component actuating) device that is relatively easily to manufacture and assembly and that is relatively easily for a rider to operate.

In view of the above, it will be apparent to those skilled in the art from this disclosure that there exists a need for an improved control device for operating a bicycle component that is relatively easy to operate. This invention addresses this need in the art as well as other needs, which will become apparent to those skilled in the art from this disclosure.

SUMMARY OF THE INVENTION

One object of the present invention is to provide a bicycle control (component actuating) device that has a pair of operating levers for operating a control unit in which the operating levers are relatively easy to operate and which can be assembled in a relatively easy manner.

The foregoing objects can basically be attained by providing a bicycle control device that basically comprises a base member, a control unit, an attachment member, a first operating lever and a second operating lever. The base member includes a handlebar mounting structure. The control unit is mounted to the base member. The attachment member is movably coupled to the base member. The first operating lever is operatively coupled to the control unit. The first operating lever is coupled to the attachment member to move with the attachment member when the attachment member is moved relative to the base member. The first operating lever is pivotally coupled to the attachment member to pivot relative to the attachment member about a first pivot axis to operate the control unit. The second operating lever is operatively coupled to the control unit and pivotally coupled to the attachment member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
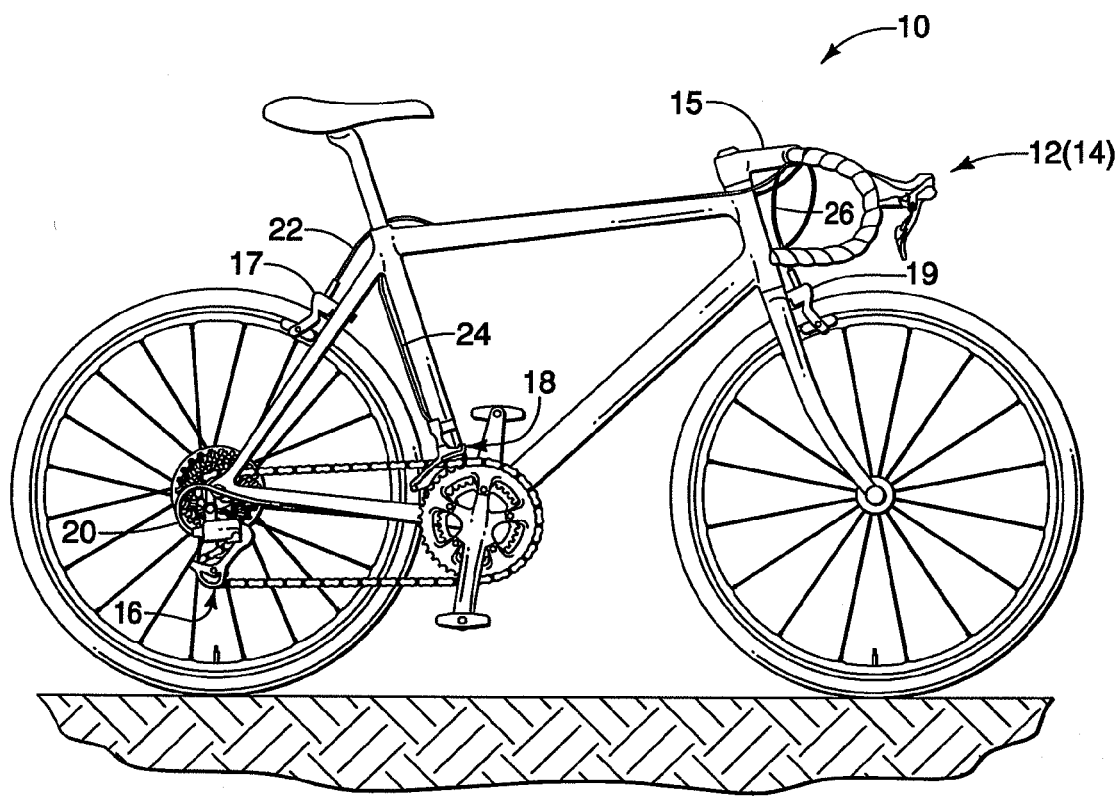
FIG. 1 is a side elevational view of bicycle equipped with a bicycle control (brake/shift) device coupled to a drop type handlebar in accordance with a preferred embodiment of the present invention.
Figure 2:
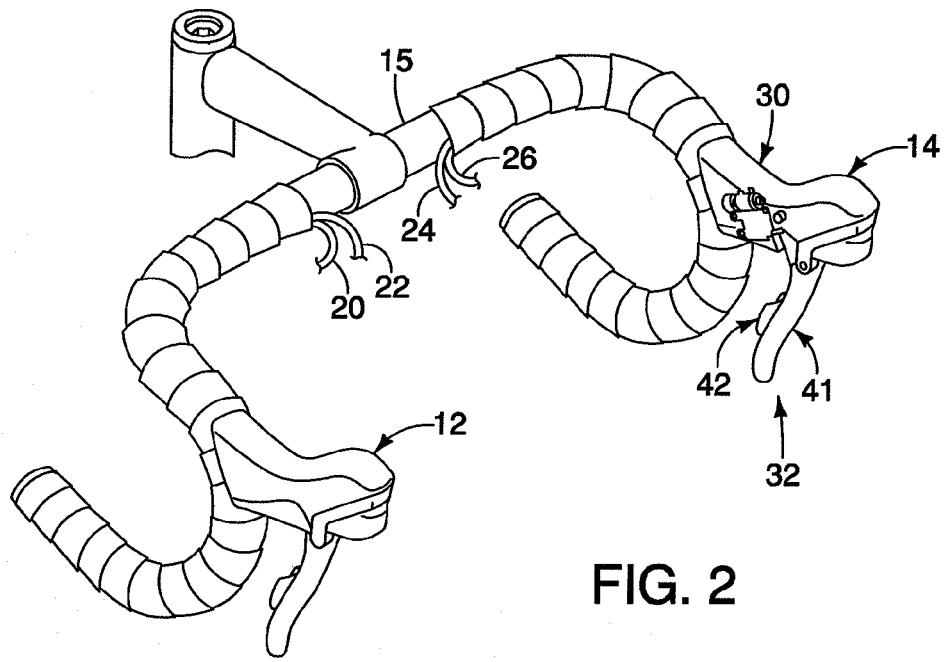
FIG. 2 is an enlarged partial perspective view of the drop type handlebar with the bicycle control (brake/shift) device in accordance with the illustrated embodiment of the present invention.

Referring initially to FIGS. 1 and 2, a bicycle 10 is illustrated in accordance with a pair of bicycle control devices 12 and 14 mounted on a bicycle handlebar 15 in accordance with one embodiment of the present invention. The bicycle control device 12 is a right hand side control device operated by the rider's right hand to operate a rear derailleur 16 and a rear brake device 17, while the bicycle control device 14 is a left hand side control device operated by the rider's left hand to operate a front derailleur 18 and a front brake device 19. In the illustrated embodiment, the bicycle control device 12 is operatively coupled to the rear derailleur 16 via a shift control cable 20 and the rear brake device 17 via a brake control cable 22. The bicycle control device 14 is operatively coupled to the front derailleur 18 via a shift control cable 24 and the front brake device 19 via a brake control cable 26. Preferably, the cables 20, 22, 24 and 26 are conventional bicycle control cables that have an outer casing the covers an inner wire. Alternatively, the bicycle control devices 12 and 14 can be switched so that the rider can operate the rear and front derailleurs 16 and 18 with opposite hands and/or operate the rear and front brake devices 17 and 19 with opposite hands.

In the illustrated embodiment, the right and left hand side bicycle control devices 12 and 14 are essentially identical in operation, except that they are mirror images of each other and the number of shift positions are different. In other words, the left hand side bicycle control device 14 is substantially identical to the right hand side bicycle control device 12, except for the shifting unit (not shown) of the right hand side bicycle control device 12 has been modified to be a mirror image and to increase the number of gears that can be shifted. Thus, only the left hand side bicycle control device 14 will be discussed and illustrated herein.

Figure 14:
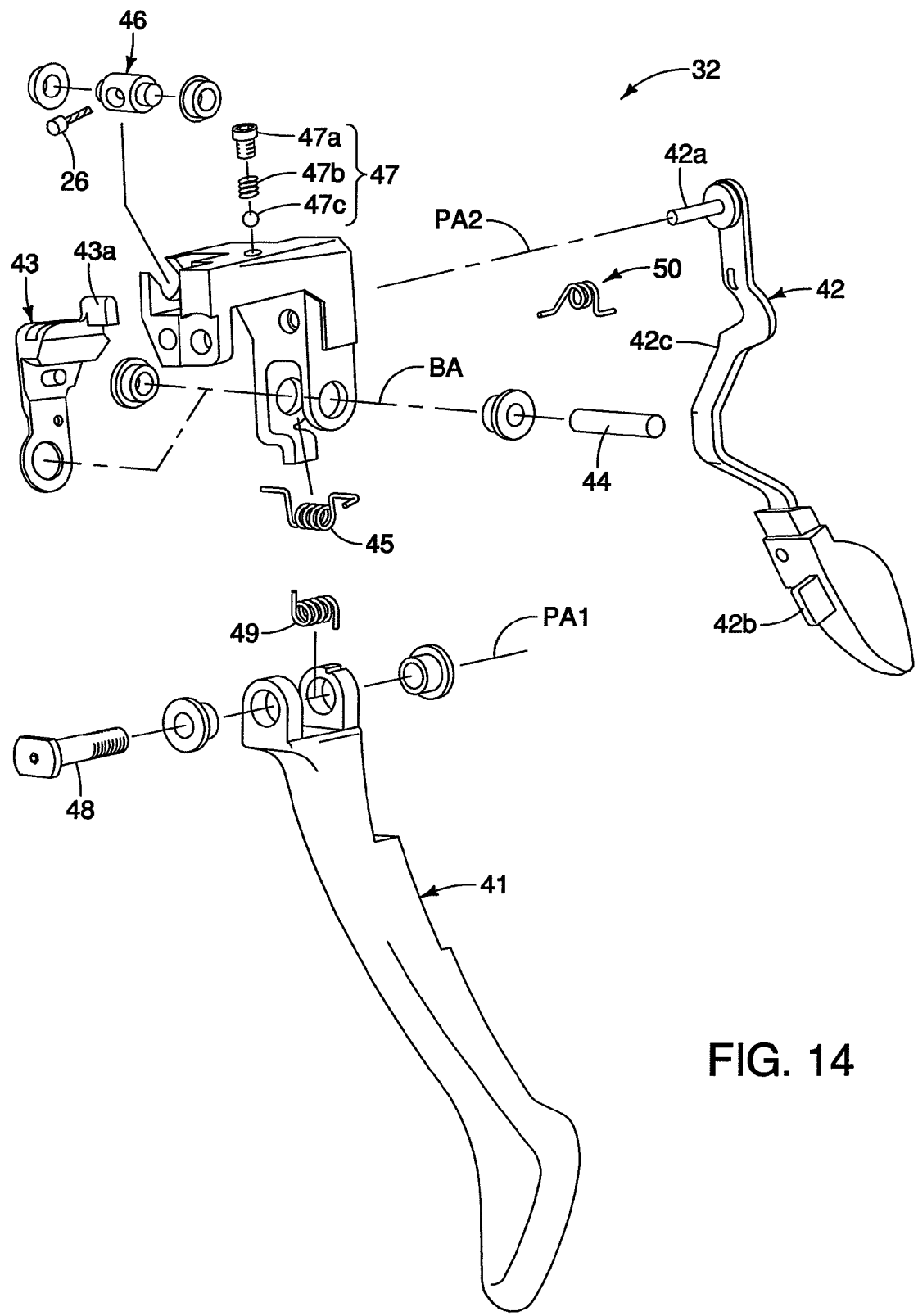
FIG. 14 is an exploded perspective view of the operating lever unit for the left bicycle control (brake/shift) device.
Figure 15:
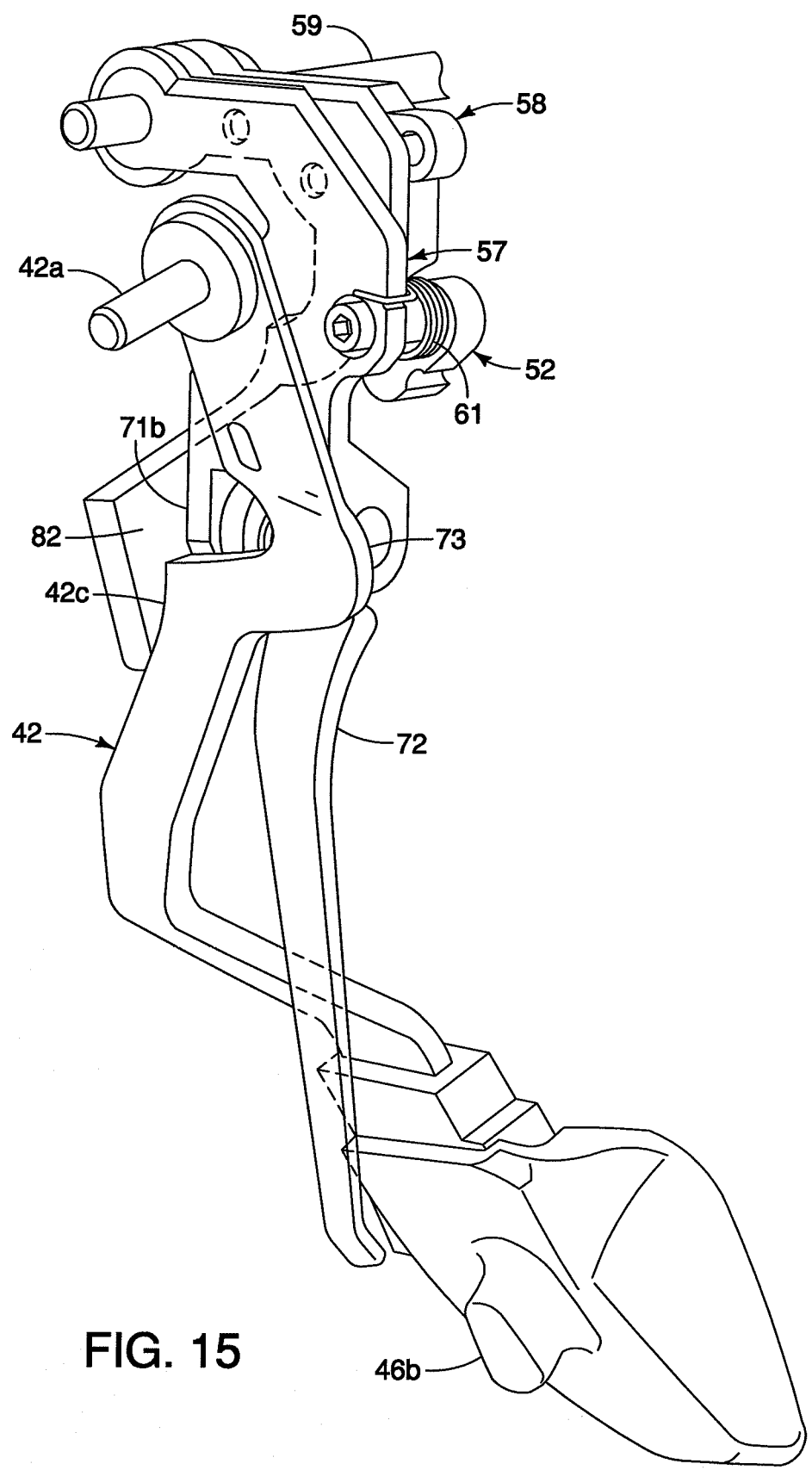
FIG. 15 is a front end perspective view of the second operating lever and selected parts of the shift control unit for the left bicycle control (brake/shift) device.
Figure 16:
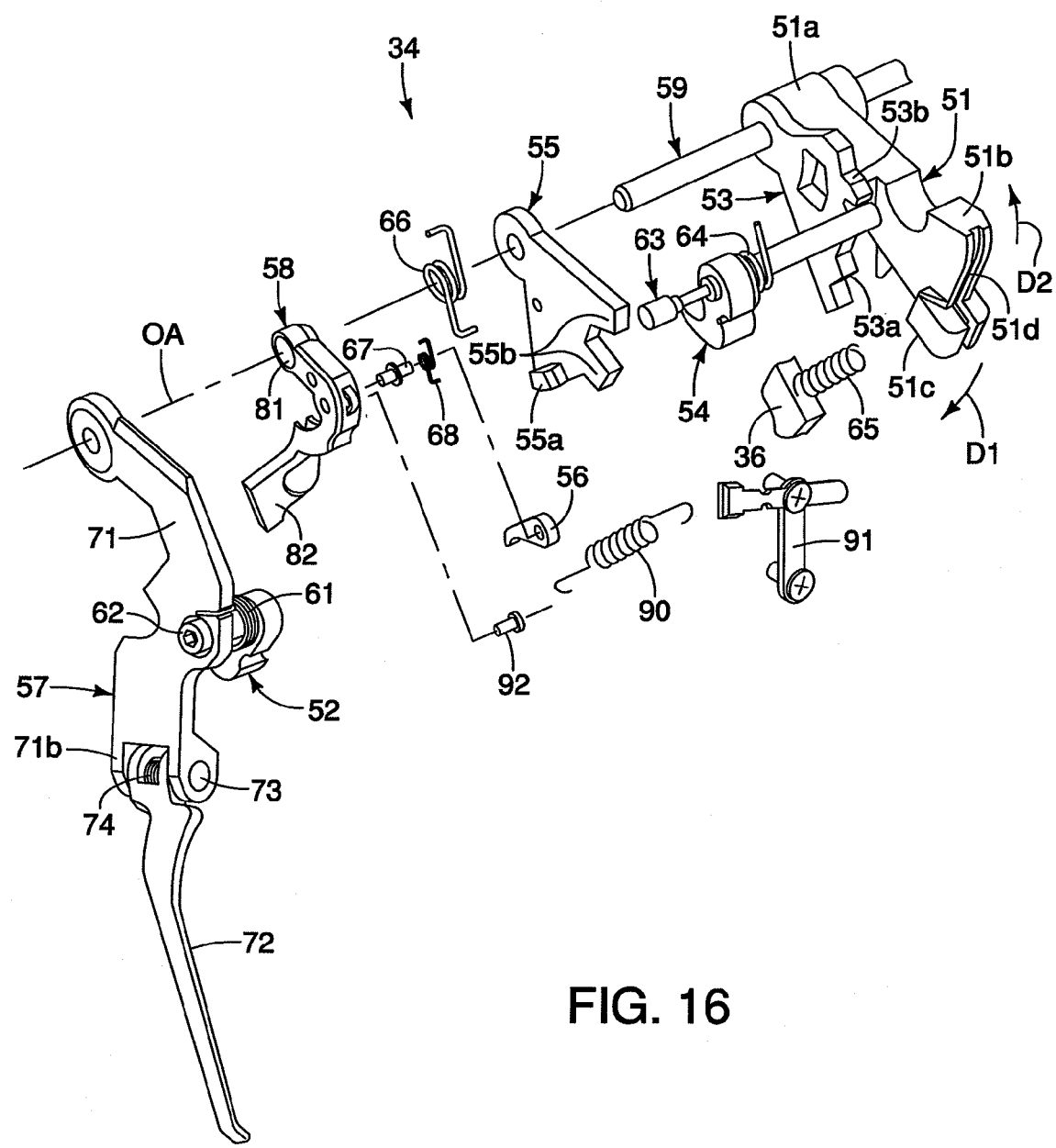
FIG. 16 is an exploded perspective view of selected parts of the shift control unit for the left bicycle control (brake/shift) device.

Referring now to FIGS. 3 to 16, the left hand side bicycle control device 14 basically includes a bracket unit 30 (e.g., FIGS. 3 to 8), a lever unit 32 (e.g., FIGS. 8 to 14) and a shift control unit 34 (e.g., FIGS. 15 and 16). As seen in FIG. 8, the bracket unit 30 is an independent unit that is separable from the operating lever unit 32. The bracket unit 30 is configured and arranged to be fixedly coupled to the handlebar 15. Basically, the bracket unit 30 is configured and arranged to house the shift control unit 34, while the operating lever unit 32 is used to operate the shift control unit 34 to pull or release the inner wire of the shift control cable 24 as discussed below.

Basically, the bracket unit 30 includes a base member 36 and a handlebar mounting structure 38. The base member 36 functions as a gripping member for the rider's hand. Typically, the base member 36 is constructed of one or more pieces of hard rigid plastic that functions as housing for enclosing the shift control unit 34. The precise construction of the base member 36 is not relevant to the present invention, except for as explained herein, e.g., the base member 36 is configured and arranged to function as a gripping member for the rider's hand, and function as housing that encloses the shift control unit 34 and that the operating lever unit 32 is attached thereto as explained below.

Figure 3:
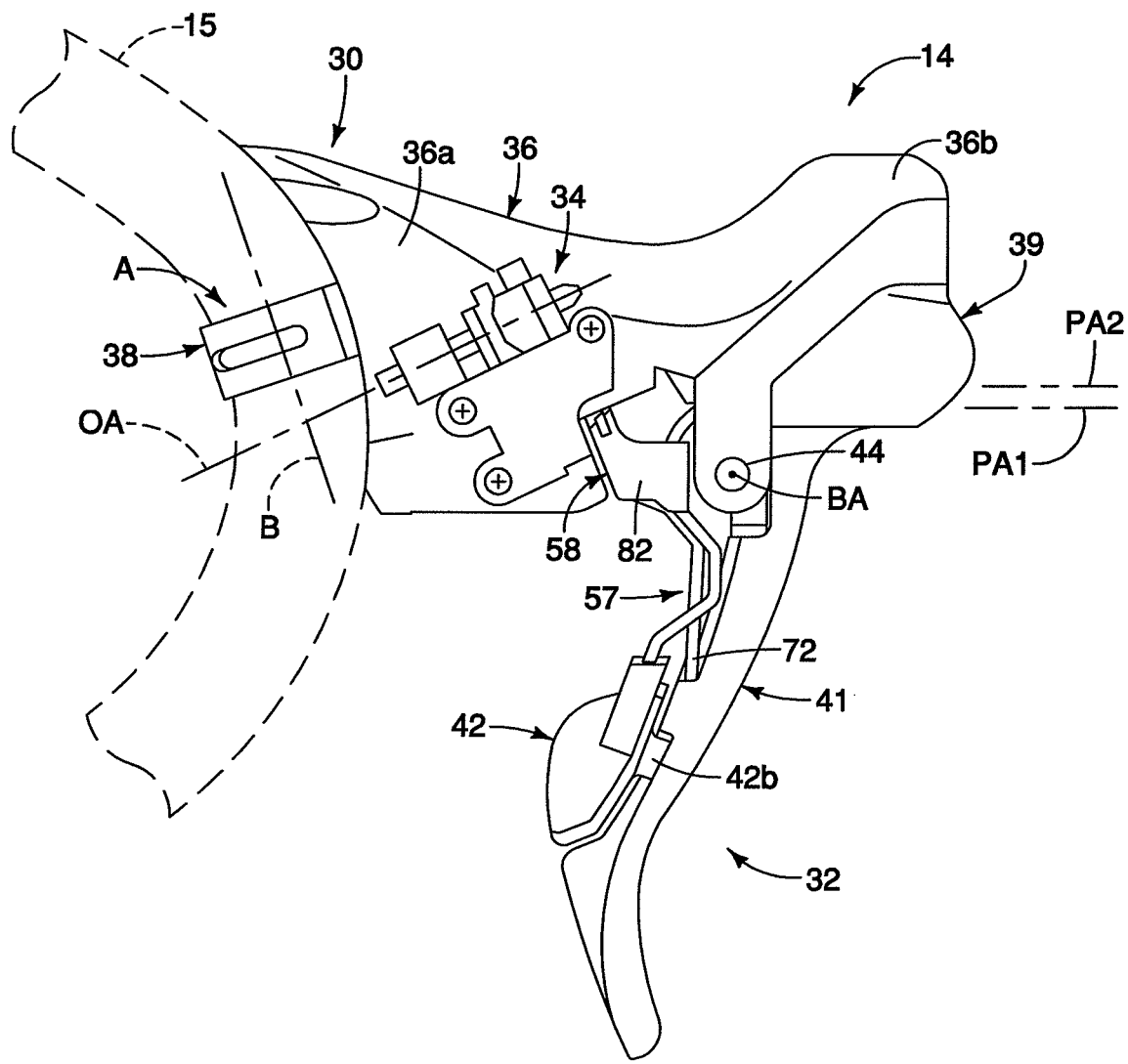
FIG. 3 is an inside elevational view of the left bicycle control (brake/shift) device with the first and second operating levers in the rest positions.
Figure 4:
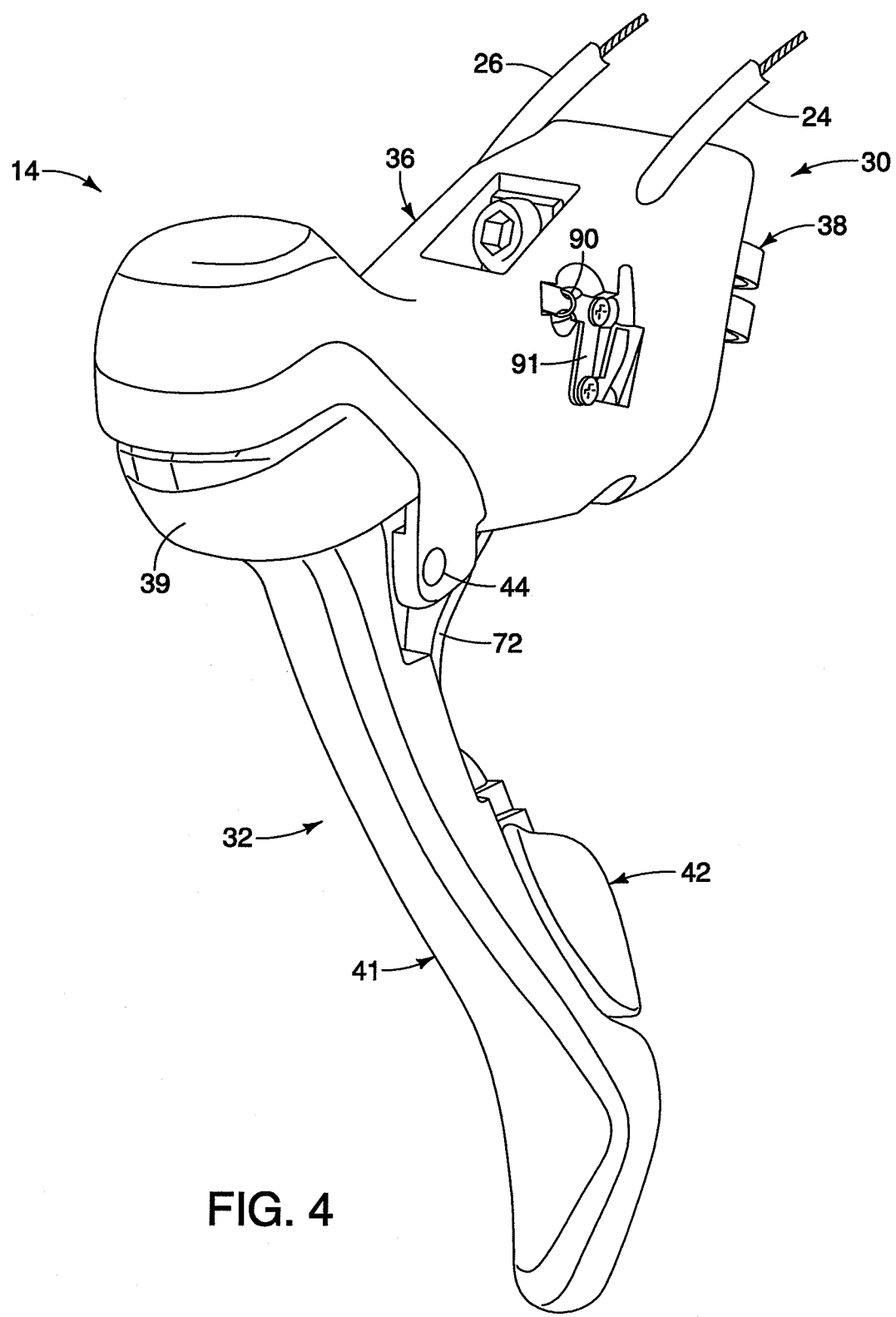
FIG. 4 is an outside perspective view of the left bicycle control (brake/shift) device with the first and second operating levers in the rest positions.

As best seen in FIGS. 3 and 4, the base member 36 has a first end section 36a with the handlebar mounting structure 38 and a second end section 36b remotely disposed from the first end section 36a. The second end section 36b has a cap 39 that covers the upper end of the operating lever unit 32. The operating lever unit 32 is attached at the second end section 36b. The base member 36 is fixedly mounted to the handlebar 15 by the handlebar mounting structure 38, which defines a handlebar receiving area A with a central handlebar mounting axis B as seen in FIG. 3. The handlebar mounting structure 38 is preferably a conventional band clamp or similar structure.

Referring now to FIG. 8 to 14, the operating lever unit 32 will now be discussed in more detail. Basically, the operating lever unit 32 includes an attachment member 40, a first operating lever 41, a second operating lever 42, and a brake wire guide 43. The attachment member 40 is movably coupled to the base member 36 to pivot about a non-shift or brake pivot axis BA. The attachment member 40 also movably supports the first and second operating levers 41 and 42 to pivot about first and second shifting pivot axes PA1 and PA2, respectively. The first and second operating levers 41 and 42 are located at the second end section 36b. The second operating lever 42 is located behind the first operating lever 41, when the first and second operating levers 41 and 42 are in their rest positions. In particular, the first and second operating levers 41 and 42 are aligned in the braking (non-shift movement) plane or path BP of the first operating lever 41, when the first and second operating levers 41 and 42 are in rest positions.

Figure 5:
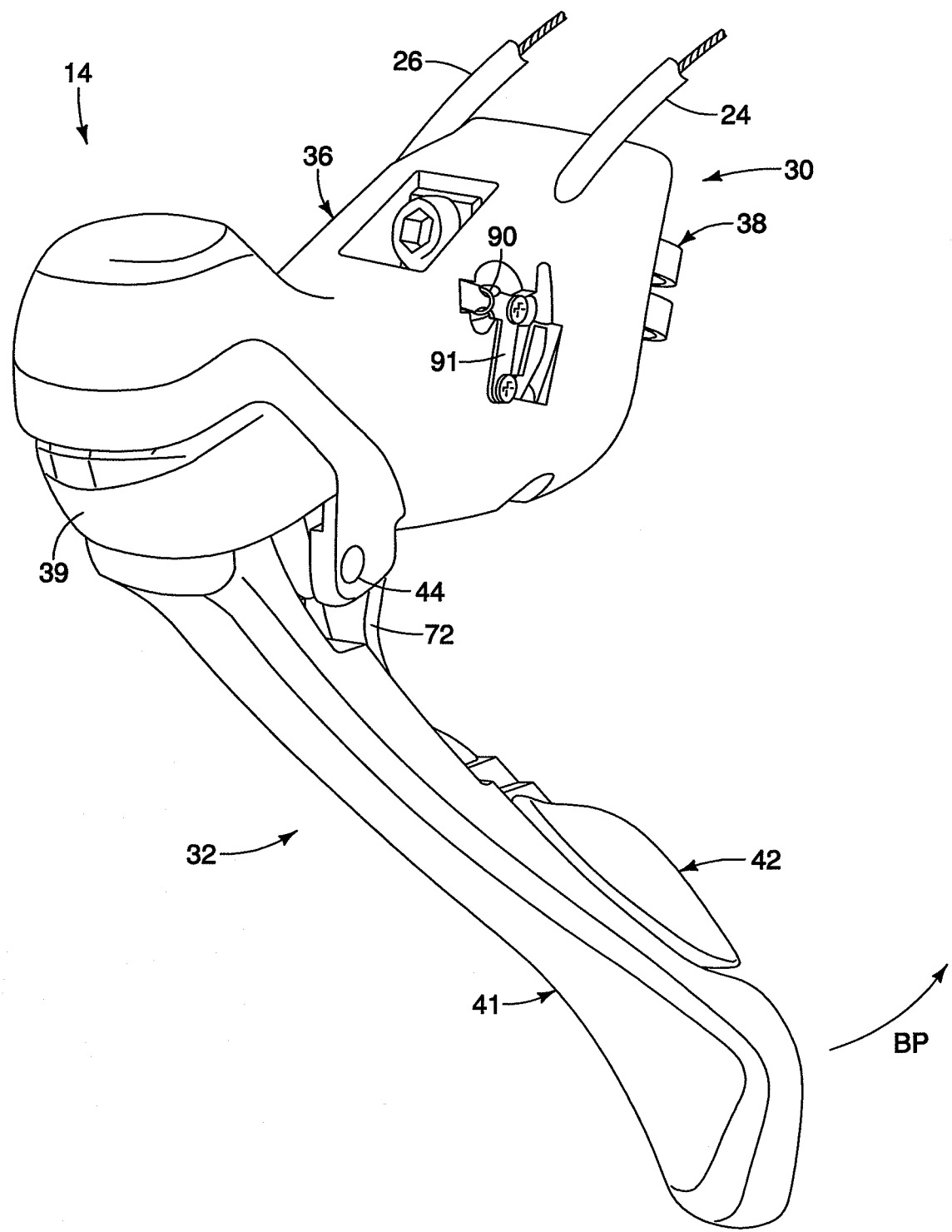
FIG. 5 is an outside perspective view, similar to FIG. 4, of the left bicycle control (brake/shift) device with the first and second operating levers being moved from the rest positions along the braking path or plane.
Figure 6:
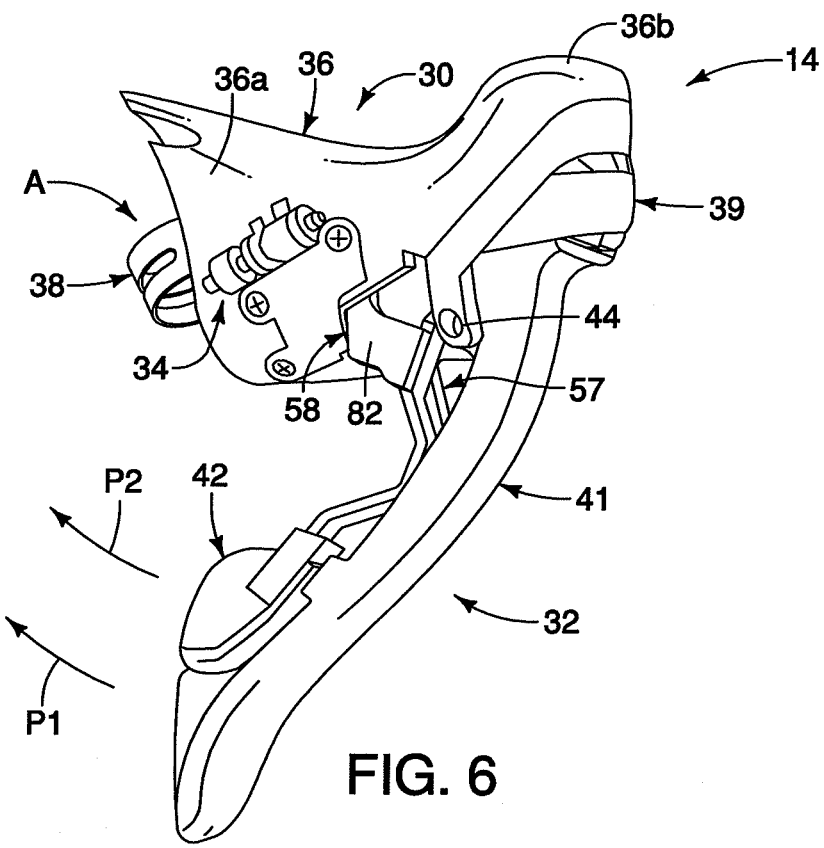
FIG. 6 is an inside perspective view of the left bicycle control (brake/shift) device with the first and second operating levers moved to a shifting position to perform a shift wire pulling operation.

In the illustrated embodiment, the first operating lever 41 is configured and arranged to perform both a braking operation when pivoted about the brake pivot axis BA as seen in FIG. 5, and a wire pulling operation when pivoted about the first shift pivot axis PA1 as seen in FIG. 6. In other words, the first operating lever 41 is a dual function operating lever that performs a braking operation in addition to a shifting operation. Thus, the bicycle control device 14 is configured and arranged to perform both a braking operation and a shifting operation as a single integrated unit that is mounted to the handlebar 15.

Figure 7:
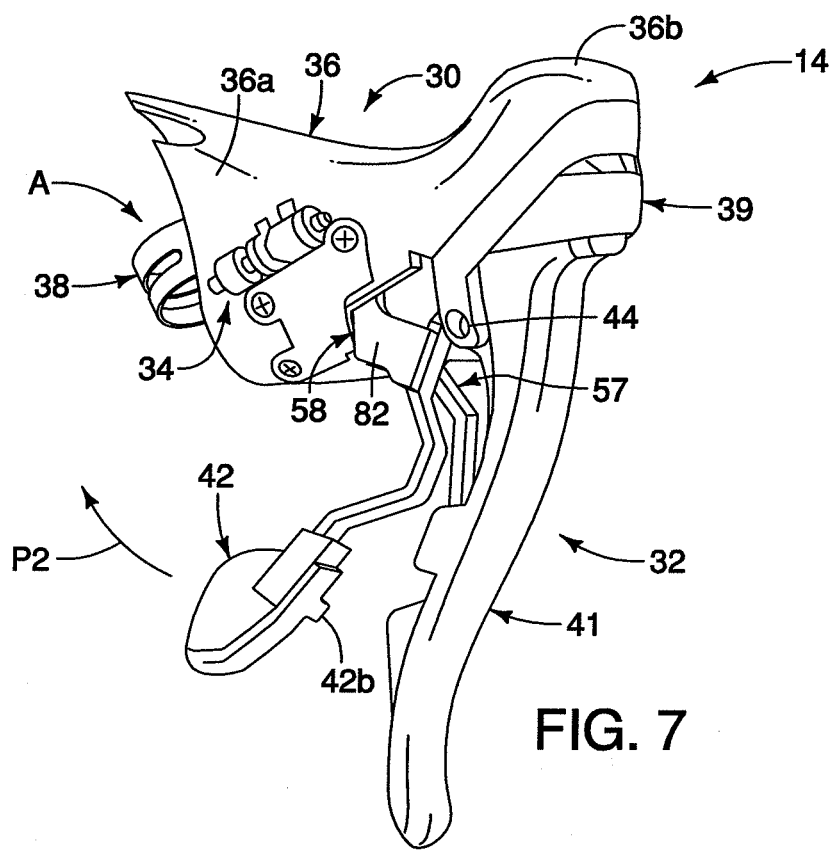
FIG. 7 is an inside perspective view, similar to FIG. 6, of the left bicycle control (brake/shift) device, but with only the second operating lever (shift release lever) moved to a shifting position to perform a shift wire releasing operation.
Figure 8:
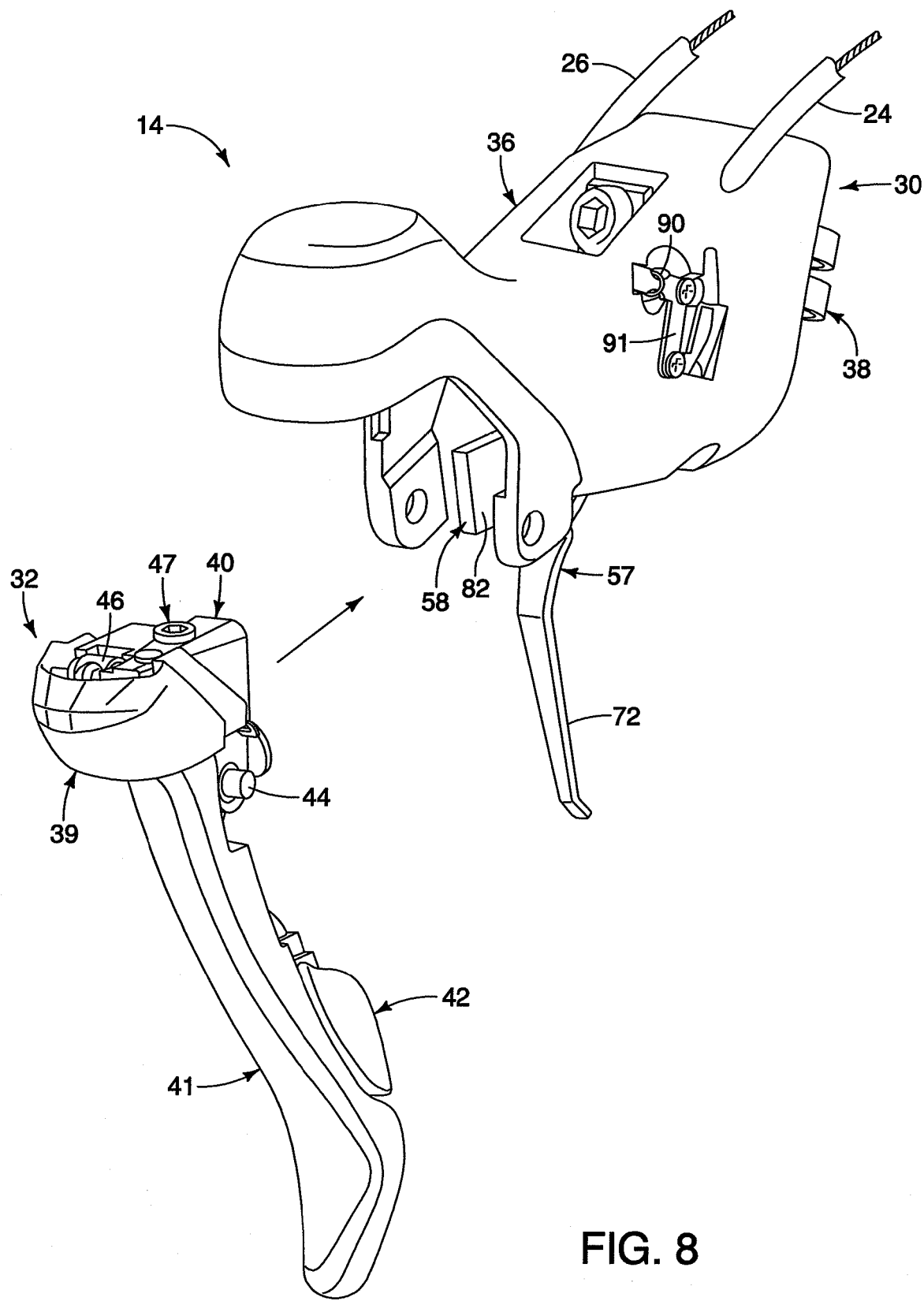
FIG. 8 is an outside, exploded perspective view of the left bicycle control (brake/shift) device with the operating lever unit being separated from the bracket unit that houses the shift control unit.

As seen in FIG. 7, the second operating lever 42 is configured and arranged to perform a wire releasing operation when pivoted about the second shift pivot axis PA2. The second operating lever 42 is operatively coupled to the shift control unit 34 to move along a second shift operating plane or path P2 to perform a wire releasing operation.

Now referring to FIGS. 5 to 8, the movements of the first and second operating levers 41 and 42 will now be generally discussed with respect to the base member 36 that is configured to be fixedly mounted to the handlebar 15 by the handlebar mounting structure 38. In this illustrated embodiment, the first and second operating levers 41 and 42 are configured and arranged relative to each other such that they are aligned in the non-shift (brake) movement path BP to move in the non-shift (brake) movement path BP. In particular, the second operating lever 42 is located behind the first operating lever 41 so that the first and second operating levers 41 and 42 move together during a braking operation as seen in FIG. 5. The first control member 57 contacts the rearward facing side of the first operating lever 41 and is located between the first and second operating levers 41 and 42. The first and second operating levers 41 and 42 are configured and arranged to pivot in a first and second rotational directions with respect to the base member 36 from the rest positions, respectively, with the first and second rotational directions being directions toward a central longitudinal plane of the bicycle 10. The first and second shift operating planes P1 and P2 of the first and second operating levers 41 and 42 are, respectively, intersect with the non-shift (brake) movement path BP (non-shift movement plane) of the first operating lever 41. Preferably, the non-shift (brake) movement path BP (non-shift movement plane) of the first operating lever 41 is perpendicularly oriented with respect to the first and second shift operating planes or paths P1 and P2 of the first and second operating levers 41 and 42.

As seen in FIG. 6, in the illustrated embodiment, the first and second operating levers 41 and 42 are configured and arranged relative to each other such that the first and second operating levers 41 and 42 move together to perform a wire winding operation. In other words, when a wire winding operation is desired, the rider pushes the first operating lever 41 in a direction transverse to the center plane of the base member 36 along the first shift operating plane or path P1 from a rest position to a shifting position to operate the shift control unit 34.

As seen in FIG. 7, in the illustrated embodiment, the first and second operating levers 41 and 42 are configured and arranged relative to each other such that the first operating lever 41 remains stationary when the second operating lever 42 is operated to operate the shift control unit 34 to perform a wire releasing operation. In other words, when a wire releasing operation is desired, the rider pushes the second operating lever 42 in a direction transverse to the center plane of the base member 36 along the second shift operating plane or path P2 from a rest position to a shifting position to operate the shift control unit 34. As mentioned above, the second operating lever 42 moves independently with respect to the first operating lever 41 as the second operating lever 42 is moved from the rest position to the shifting position to perform a wire releasing operation. Thus, the second operating lever 42 is a separate operating member from the first operating lever 41 and the second operating lever 42 can move independently of the first operating lever 41.

Figure 9:
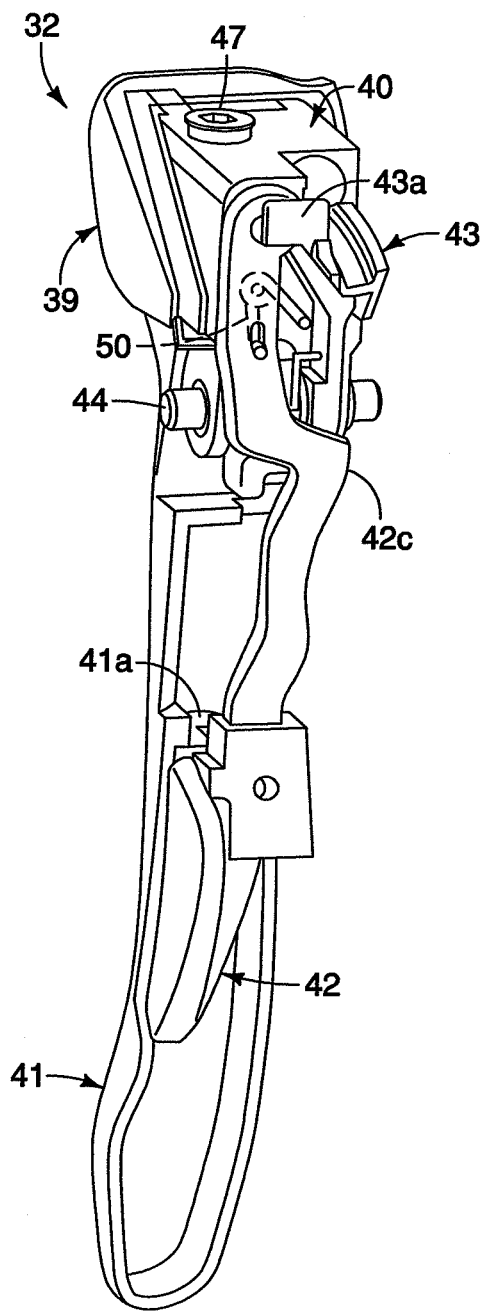
FIG. 9 is a rear perspective view of the operating lever unit with the first and second operating levers in the rest positions.
Figure 10:
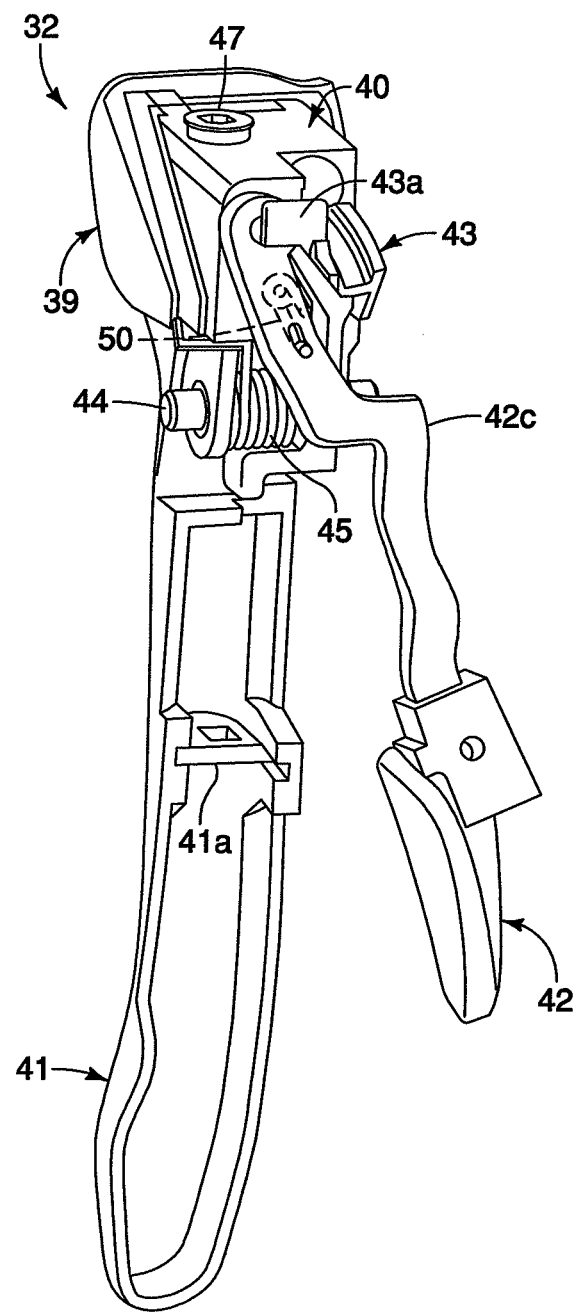
FIG. 10 is a rear perspective view, similar to FIG. 9, of the operating lever unit, but with the second operating lever (shift release lever) moved to a shifting position with the first operating lever (brake/shift winding lever) remaining stationary.
Figure 11:
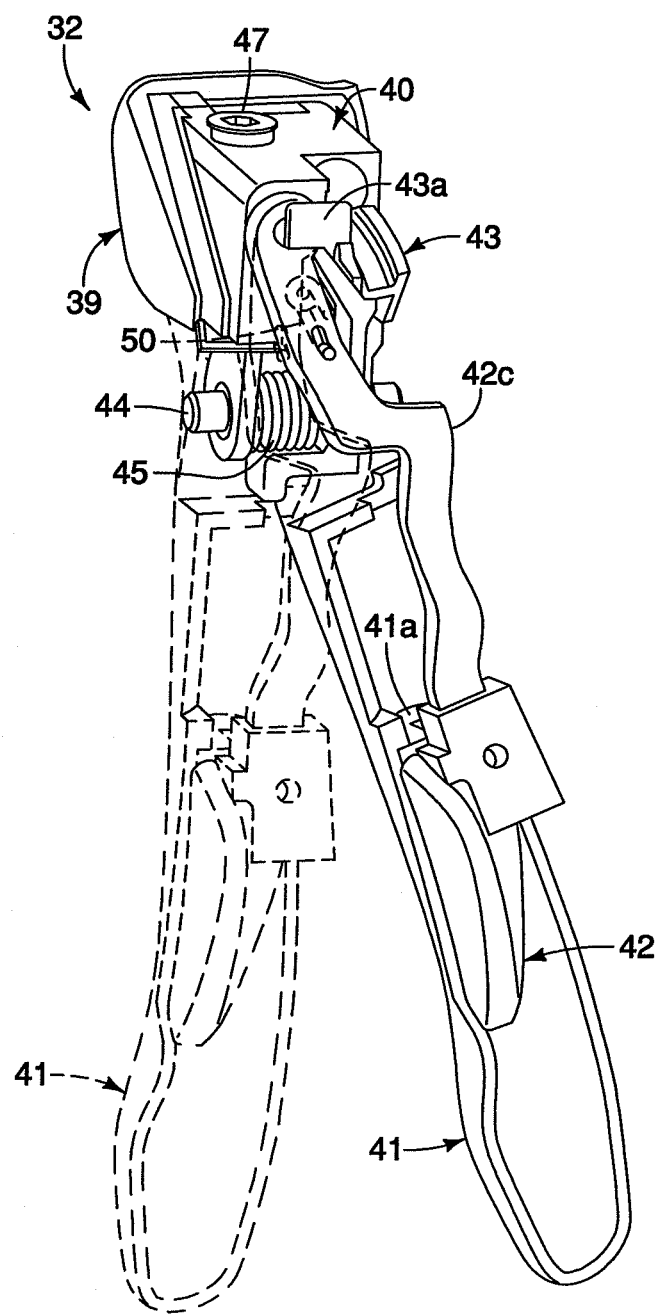
FIG. 11 is a rear perspective view, similar to FIG. 10, of the operating lever unit, but with the first and second operating levers being moved together during shifting with the first operating lever (brake/shift winding lever)

As best seen in FIGS. 9 to 11, the attachment member 40 is coupled to the base member 36 by a pivot pin 44 that defines brake pivot axis BA. A torsion spring or biasing member 45 is disposed on the pivot pin 44 to urge the attachment member 40 to a rest (non-braking) position. The torsion spring 45 has a first end engaged with the attachment member 40 and a second end engaged with the base member 36 to apply an urging force on the attachment member 40 relative to the base member 36 and to normally maintain the attachment member 40 in the rest (non-braking) position. The torsion spring 45 has its coiled portion located on the pivot pin 44 as seen in FIG. 10.

Figure 12:
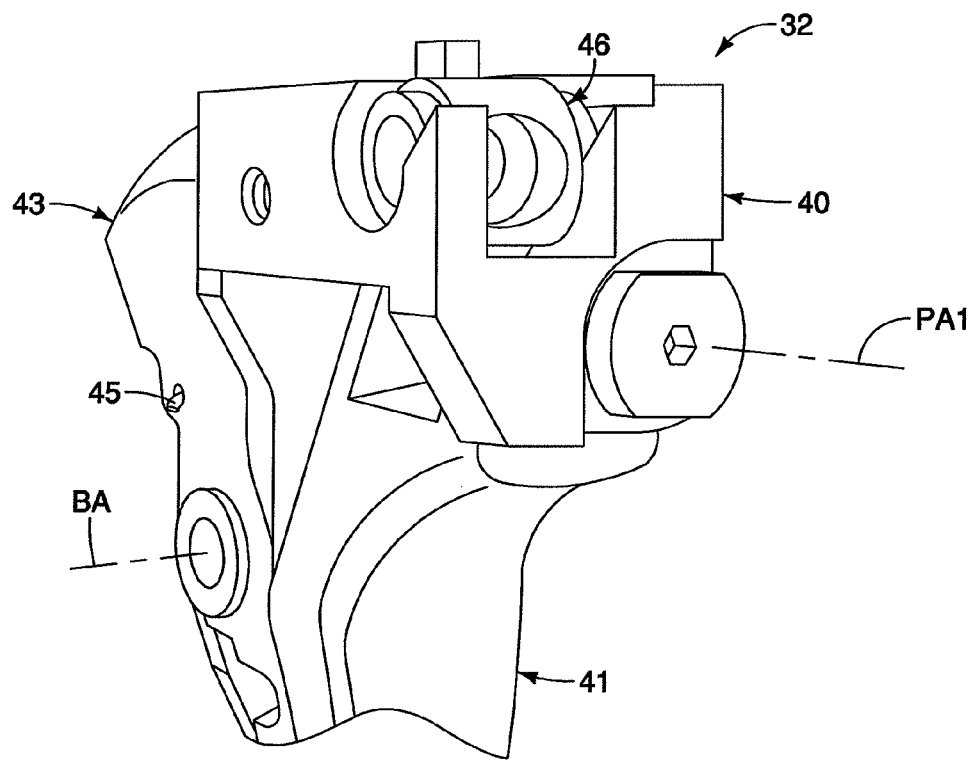
FIG. 12 is a partial front perspective view of the operating lever unit with the first and second operating levers in the rest positions.
Figure 13:
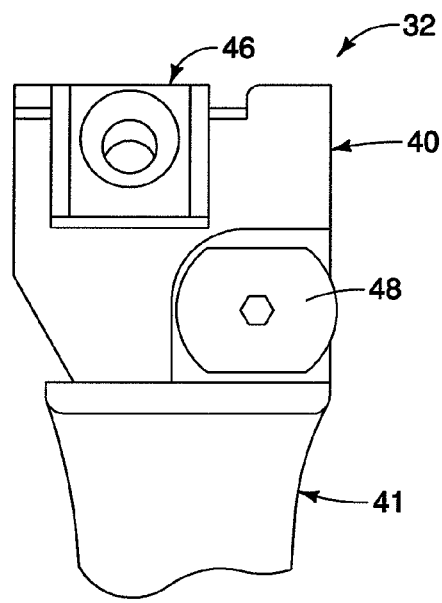
FIG. 13 is a partial front elevational view of the operating lever unit with the first and second operating levers in the rest positions.

As best seen in FIGS. 12 to 14, the attachment member 40 includes a cable attachment structure 46 for attaching the inner wire of the brake cable 26 thereto. Thus, when the attachment member 40 is pivoted about the brake pivot axis BA by the first operating lever 41, the inner wire of the brake control cable 26 is pulled to operate the front brake device 19. Preferably, the attachment member 40 has a mounting hole (not shown) for holding the brake wire guide 43 in place when the operating lever unit 32 is assembled.

As seen in FIG. 14, a positioning mechanism 47 is attached to the attachment member 40 to selectively maintain the first operating lever 41 in the rest position. The positioning mechanism 47 includes a bolt 47a, a compression spring 47b and a ball or detent 47c. The ball 47c is biased against the first operating lever 41 normally hold the first operating lever 41 from pivoting about the first shift pivot axis PA1.

As seen in FIGS. 12 to 14, the first operating lever 41 is pivotally attached to the attachment member 40 by a pivot bolt 48. A torsion spring or biasing member 49 is disposed on the pivot bolt 48 to urge the first operating lever 41 to the rest (non-shifting) position. The torsion spring 49 has a first end engaged with the attachment member 40 and a second end engaged with the first operating lever 41 to apply an urging force on the first operating lever 41 relative to the attachment member 40 and to normally maintain the first operating lever 41 in the rest (non-shifting) position. The torsion spring 49 has its coiled portion located on the pivot bolt 48.

Still referring to FIGS. 12 to 14, the first operating lever 41 is coupled to the attachment member 40 to move with the attachment member 40 as an integrated unit when the attachment member 41 is moved relative to the base member 36 about the brake pivot axis BA to perform a braking operation as seen in FIG. 5. The first operating lever 41 is operatively coupled to the shift control unit 34 such that a wire pulling operation occurs when the first operating lever 41 is pivoted from the rest position to the shifting position about the first shift pivot axis PA1.

As best seen in FIG. 10, the first operating lever 41 has a control member connecting part 41a for operatively coupling the shift control unit 34 thereto. Thus, when the first operating lever 41 is pivoted about the first shift pivot axis PA1 to perform a wire pulling operation as seen in FIG. 11, the shift control unit 34 is operated in response to this pivotal movement of the first operating lever 41.

As seen in FIG. 14, the second operating lever 42 has a pivot shaft 42a that is received in a hole (not shown) of the attachment member 40 to provide a pivotal connection therebetween. The pivot shaft 42a defines the second shift pivot axis PA2, which is offset from the first shift pivot axis PA1. The second operating lever 42 is retained on the attachment member 40 by a tab 43a of the brake wire guide 43 as seen in FIGS. 9 to 11. As also seen in FIG. 14, the second operating lever 42 has a flange or abutment 42b projecting towards the first operating lever 41. This flange or abutment 42b contacts the rear side of the first operating lever 41 when the second operating lever 42 is in the rest position. Thus, when the first operating lever 41 is moved about the first shift pivot axis PA1 to perform a wire pulling operation as seen in FIG. 11, the second operating lever 42 is pivoted about the second shift pivot axis PA2 so as to move with the first operating lever 41 as seen in FIG. 11.

As best seen in FIGS. 7, 9 and 10, the second operating lever 42 is pivotally coupled to the attachment member 40 to move about the second shift pivot axis PA2, while the attachment member 40 remains stationary. In other words, the second operating lever 42 is independently pivotally coupled to the attachment member 40 such that the first operating lever 41 remains stationary in response to the second operating lever 42 being pivoted relative to the attachment member 40. However, the second operating lever 42 moves with the attachment member 40 when the first operating lever 41 is pivoted about the brake pivot axis BA to perform a braking operation as seen in FIG. 5. On the other hand, the second operating lever 42 moves relative to the attachment member 40 when the first operating lever 41 is pivoted about the first shift pivot axis PA1 to perform a wire pulling operation as seen in FIG. 11. Thus, when the second operating lever 42 is pivoted about the second shift pivot axis PA2 to perform a wire releasing operation as seen in FIGS. 7 and 10, the shift control unit 34 is operated in response to this pivotal movement of the second operating lever 42.

As seen in FIG. 9, a torsion spring or biasing member 50 is disposed between the attachment member 40 and the second operating lever 42 to urge the second operating lever 42 to a rest (non-shifting) position. The torsion spring 50 has a first end engaged with the attachment member 40 and a second end engaged with the second operating lever 42 to apply an urging force on the second operating lever 42 and to normally maintain the second operating lever 42 in the rest (non-shifting) position.

Figure 17:
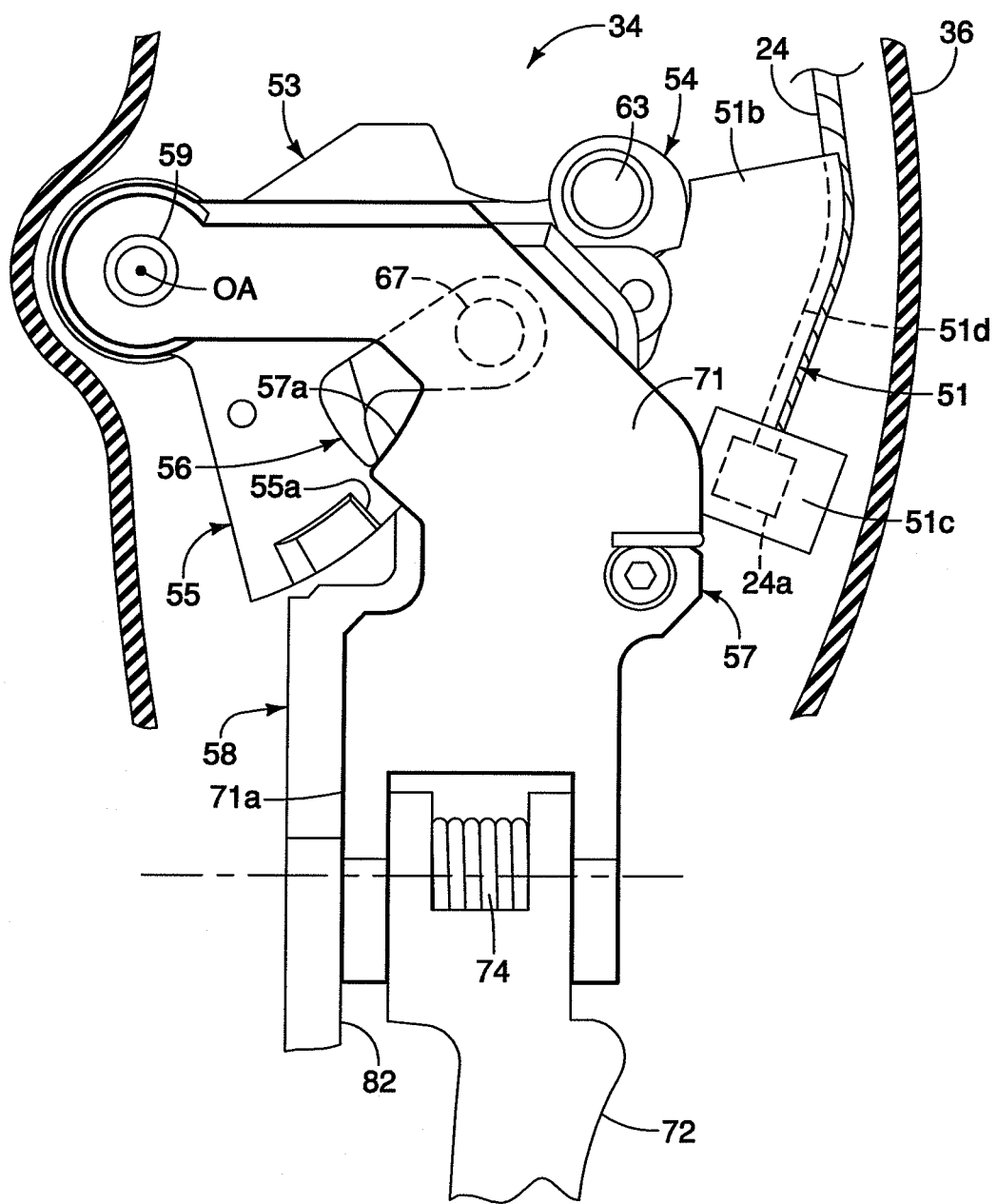
FIG. 17 is an enlarged partial elevational view of selected parts of the shift control unit and the upper ends of the control members with the side walls of the base member being diagrammatically illustrated and the wire takeup member of the shift control unit being in a fully released position.
Figure 18:
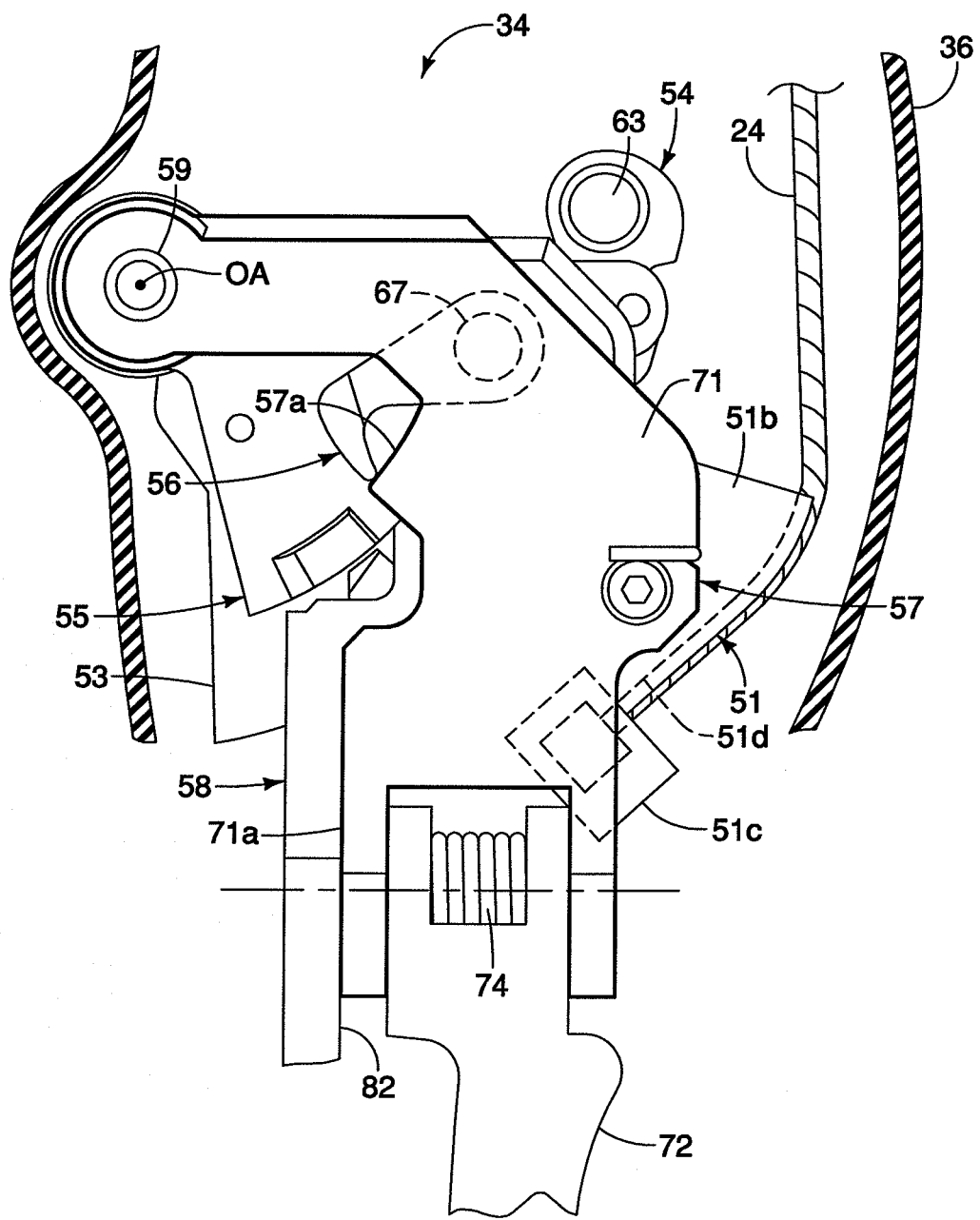
FIG. 18 is an enlarged partial elevational view of selected parts of the shift control unit and the upper ends of the control members with the side walls of the base member being diagrammatically illustrated and the wire takeup member of the shift control unit being in a fully pulled position.
Figure 19:
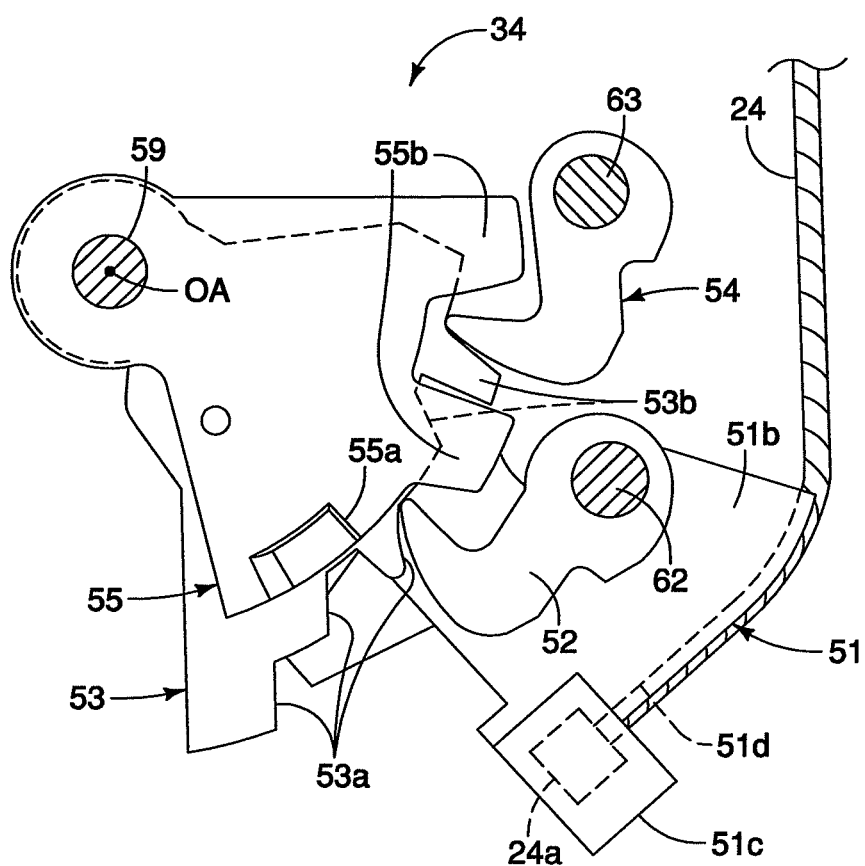
FIG. 19 is a simplified elevational view of selected parts of the shift control unit with the wire takeup member of the shift control unit being in the fully pulled position.

Referring now to FIG. 16 to 18, the shift control unit 34 will now be discussed in more detail. In the illustrated embodiment, the shift control unit 34 is a cable operating device that basically includes a wire takeup member 51, a wire pulling pawl 52, a positioning plate or member 53, a positioning pawl 54, a release plate or member 55, a release pawl 56, a first control member 57, a second control member 58 and a shift unit axle 59. The wire takeup member 51, the positioning plate 53, the release plate 55, the first control member 57 and the second control member 58 are all rotatably mounted on the shift unit axle 59, which defines a shift unit operating axis OA. In other words, the shift unit axle 59 forms the operating axis OA of the shift control unit 34 with the wire takeup member 51, the positioning plate 53, the release plate 55, the first control member 57 and the second control member 58 being pivotally mounted about the operating axis OA of the shift control unit 34.

The shift control unit 34 is mounted to the base member 36 by the shift unit axle 59. The shift control unit 34 is basically operated by the first and second operating levers 41 and 42 to pull or release the inner wire of the shift control cable 24, as mentioned above. While the shift control unit 34 of the illustrated embodiment is a preferred control unit, the operating lever unit 32 can be used with other types of control units as needed and/or desired.

The first operating lever 41 is operatively coupled to the shift control unit 34 via the first control member 57 to operate the shift control unit 34 (mainly, the wire takeup member 51) in a first operating (wire pulling) direction D1 (see FIG. 16) about the shift unit axle 59 of the shift control unit 34. The second operating lever 42 is operatively coupled to the shift control unit 34 via the second control member 58 to operate the shift control unit 34 (mainly, the wire takeup member 51) in a second operating (wire releasing) direction D2 (see FIG. 16) about the shift unit axle 59 of the shift control unit 34. Thus, the first and second control members 57 and 58 operatively coupling the first and second operating levers 41 and 42 to a shifting mechanism of the shift control unit 34, with the shifting mechanism being operated when the first and second operating levers 41 and 42 are selectively pivoted relative to the attachment member 40 and the shifting mechanism remains in a non-operating state when the attachment member 40 is moved relative to the base member 36 by the first operating lever 41.

Referring to FIGS. 16 to 18, the wire takeup member 51 is a fan shaped member that is pivotally mounted on the shift unit axle 59 to pivot relative to the base member 36 about the pivot or operating axis OA of the shift control unit 34. The wire takeup member 51 is attached to the inner wire of the shift control cable 24 to pull and release the inner wire of the shift control cable 24 in response to operation of the first and second operating levers 41 and 42, respectively, as mentioned above. The wire takeup member 51 is fixed to the positioning plate 53 so that the wire takeup member 51 and the positioning plate 53 move together as an integrated unit relative to the base member 36. The wire takeup member 51 has a proximal end portion 51a pivotally mounted on the shift unit axle 59 and a distal end portion 51b for pulling and releasing the inner wire of the shift control cable 24. The proximal end portion 51a of the wire takeup member 51 is preferably narrower than the distal end portion 51b of the wire takeup member 51. However, other shapes of the wire takeup member 51 are possible without departing from the present invention. The distal end portion 51b of the wire takeup member 51 has a peripheral edge with an inner wire attachment structure or point 51c and a wire receiving groove 51d. The wire attachment structure or point 51c is configured to catch an enlarged head 24a of the inner wire of the control cable 24. Thus, the wire takeup member 51 pulls and releases the inner wire of the control cable 24 on the peripheral edge of the distal end portion 51b.

As seen in FIG. 16, the wire pulling pawl 52 is pivotally mounted on the first control member 57, which in turn is pivotally mounted to the shift unit axle 59. Thus, the first control member 57 and the wire pulling pawl 52 move together with the first operating lever 41, when the first operating lever 41 is moved along the first shift operating plane P1. The wire pulling pawl 52 is further pivotally arranged to engage the positioning plate 53 when the first operating lever 41 and the first control member 57 are moved together from their rest positions to their shifting positions. The wire pulling pawl 52 is further pivotally arranged to be selectively disengaged from the positioning plate 53 in response to movement of the release plate 55 when the second control member 58 is moved from the rest position to the shifting position by the second operating lever 42. The wire pulling pawl 52 is normally urged towards engagement with the positioning plate 53 by a biasing member 61. In this illustrated embodiment, the biasing member 61 is a torsion spring that is mounted on a pivot pin 62 which in turn attaches the wire pulling pawl 52 to the first control member 57.

As seen in FIG. 16, the positioning plate 53 is fixedly coupled to the wire takeup member 51 so as to rotate together as an integrated unit. The positioning plate 53 is pivotally mounted relative to the base member 36 about the main pivot or operating axis OA of the shift unit axle 59. In particular, the positioning plate 53 is a fan shaped member that has a narrow proximal end at the main pivot or operating axis OA of the shift unit axle 59 and a wide distal end. The wide distal end of the positioning plate 53 includes a plurality (three) of winding teeth or abutments 53a that are selectively engaged by the wire pulling pawl 52, and a plurality (two) of positioning teeth or abutments 53b that are selectively engaged by the positioning pawl 54. When the first operating lever 41 and the first control member 57 are moved from their rest positions to their shifting positions to operate the shift control unit 34, the wire pulling pawl 52 engages one of the winding abutments 53a of the positioning plate 53 to rotate the wire takeup member 51 in the wire pulling direction.

As seen in FIG. 16, the positioning pawl 54 is pivotally mounted on a pivot pin 63, which is fixedly supported by the base member 36. The positioning pawl 54 is normally urged towards engagement with the positioning abutments 53b of the positioning plate 53 by a biasing member 64. In this illustrated embodiment, the biasing member 64 is a torsion spring that is mounted on the pivot pin 63 which in turn attach the positioning pawl 54 to the base member 36. Thus, positioning pawl 54 is pivotally mounted about a positioning pawl pivot axis of the pivot pin 63 to operatively engage the abutments 53b of the positioning plate 53. In other words, the positioning abutments 53b are selectively engaged by the positioning pawl 54 to maintain the positioning plate 53 and the wire takeup member 51 in one of a plurality of predetermined positions. When the first operating lever 41 is moved from the first (rest) position to the second (shifting) position to operate the shift control unit 34, the positioning pawl 54 moves momentarily out of holding engagement with the positioning abutments 53b of the positioning plate 53 in response to movement of the positioning plate 53.

As seen in FIG. 16, the release plate 55 is pivotally mounted relative to the base member 36 about the main pivot or operating axis OA of the shift unit axle 59. The release plate 55 is a fan shaped member that has a narrow proximal end at the main pivot or operating axis OA of the shift unit axle 59 and a wide distal end. In particular, the wide distal end of the release plate 55 includes a driving abutment 55a and a plurality (two) of release teeth or abutments 55b. The driving abutments 55a are selectively engaged by the release pawl 56 in response to initial movement of the second control member 58 by the second operating lever 42 from the rest position towards the shifting position.

The release plate 55 and the positioning pawl 54 are configured and arranged relative to each other such that the positioning pawl 54 is moved by the release plate 55 from a retaining position that retains the positioning plate 53 in a shift position to a releasing position that releases the positioning plate 53 in response to movement of the release plate 55. Also the release plate 55 and the wire pulling pawl 52 are configured and arranged relative to each other such that the wire pulling pawl 52 is moved with respect to the positioning plate 53 in response to movement of the release plate 55 by the second control member 58. In particular, the release plate 55 cooperates with the positioning pawl 54 to release the wire takeup member 51 so that the wire takeup member 51 rotates in the wire releasing direction D2 due to the urging force of a return spring or biasing element 65 and a cable tension due to, for example, a pull force from the front derailleur 18. The release plate 55 can rotate independently of the wire takeup member 51 and the positioning plate 53.

The return spring or biasing element 65 is preferably operatively coupled between the wire takeup member 51 and the base member 36 to urge the wire takeup member 51 and the positioning plate 53 in the wire releasing direction D2 about the shift unit axle 59. In the illustrated embodiment, the return spring or biasing element 65 is a compression spring with one end contacting the wire takeup member 51 and the other end contacting the base member 36, as seen in FIG. 16. The wire takeup member 51 is also at least partially urged by a cable tension due to, for example, a pull force from the front derailleur 18.

Upon rotation of the release plate 55, the release abutments 55b selectively engage the wire pulling pawl 52 and the positioning pawl 54 to move (pivot) them out of engagement with the winding abutments 53a and the positioning abutments 53b, respectively. Basically, the release plate 55 remains stationary when the first operating lever 41 is operated and moves when the second operating lever 42 is operated. A biasing member 66 is provided on the shift unit axle 59 to urge the release plate 55 towards the rest position in the second operating direction D2. In this illustrated embodiment, the biasing member 66 is a torsion spring with the coiled portion mounted on the shift unit axle 59, a first end engaging the release plate 55 and a second end engaging a part of the base member 36.

As seen in FIG. 16, the release pawl 56 is movably (pivotally) mounted on the second control member 58 by a pivot pin 67, which is fixed to the second control member 58 so as to attach the release pawl 56 to the second control member 58. The release pawl 56 is pivotally mounted on the second control member 58 so as to move with the second control member 58, when either of the first operating lever 41 or the second operating lever 42 is moved along to perform a shifting operation.

Figure 20:
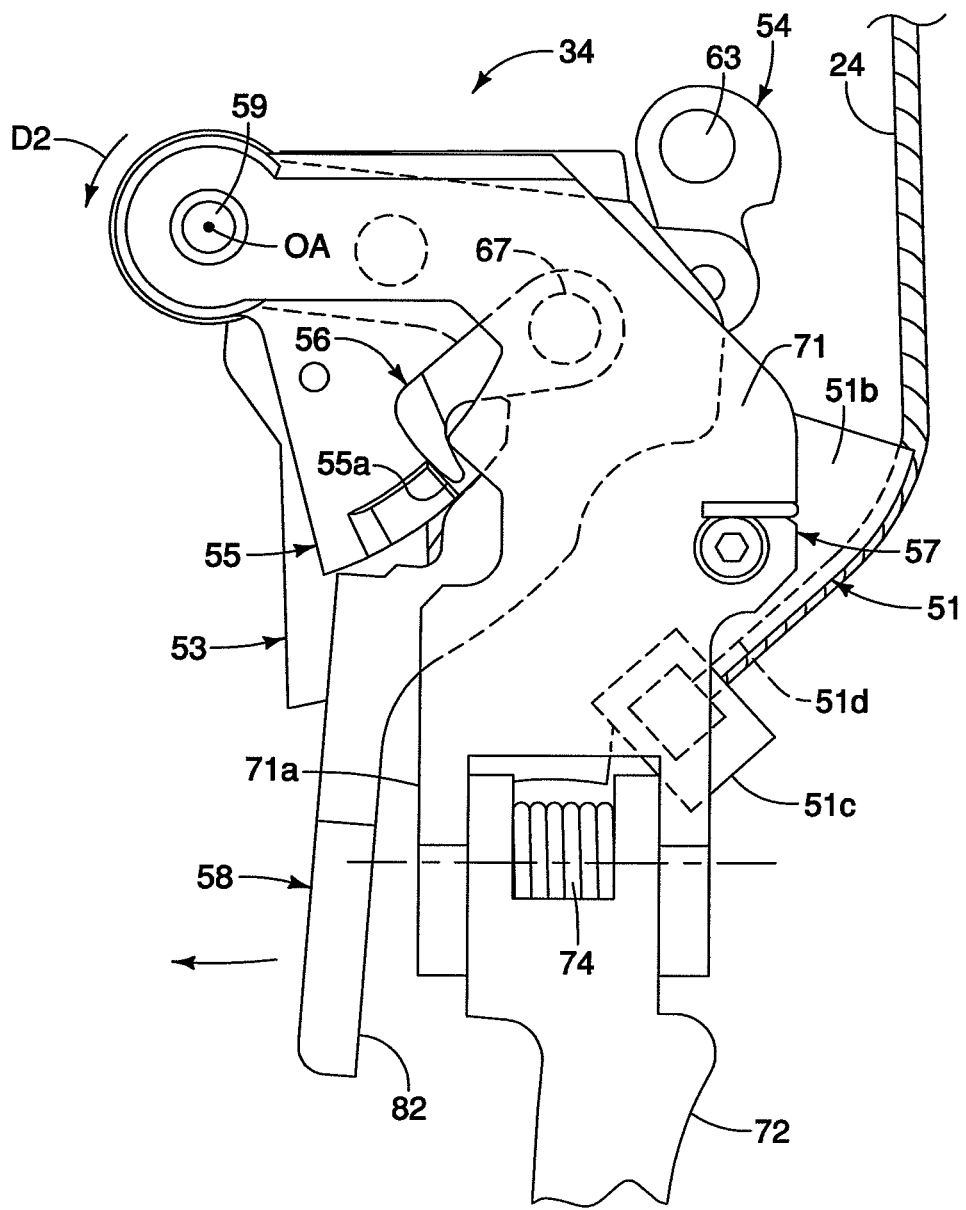
FIG. 20 is a simplified elevational view of selected parts of the shift control unit with the wire takeup member of the shift control unit being in the fully pulled position and the second control member being initially pivoted from a rest position towards the shifting position such that the release pawl engages the release plate.

In particular, the release pawl 56 is movable from a rest position in a direction away from the operating axis OA of the shift unit axle 59 to a release operating position. Normally, the release pawl 56 rest on an abutment 57a of the first control member 57 (see, FIG. 17) such that when the first operating lever 41 is operated, the release pawl 56 does not engage the driving abutment 55a. However, when the second operating lever 42 is operated, the release pawl 56 moves off of the abutment 57a of the first control member 57 as seen in FIG. 20 and moves towards engagement with the driving abutment 55a of the release plate 55.

As seen in FIG. 16, the release pawl 56 is urged in a counterclockwise direction about the pivot pin 67 by a biasing member 68. In the illustrated embodiment, the biasing member 68 is in the form of a torsion spring that is provided with a coiled portion mounted on the pivot pin 67, a first end engaged with the release pawl 56 and a second end engaged with the second control member 58.

Figure 22:
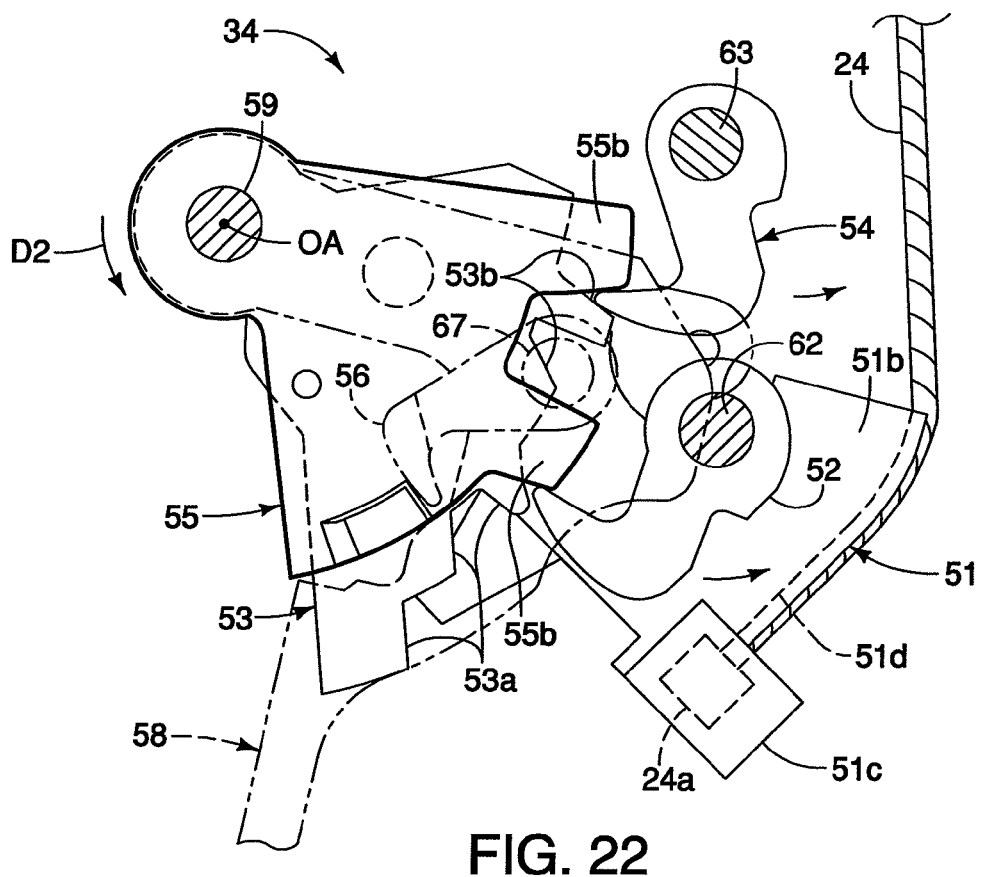
FIG. 22 is a simplified elevational view of selected parts of the shift control unit with the wire takeup member of the shift control unit being in the fully pulled position and the second control member being pivoted further from the position of FIG. 21 towards the shifting position such that the positioning pawl and the winding pawl both move out of engagement from the positioning plate to allow the positioning plate and the wire takeup member rotate towards the wire released position.
Figure 23:
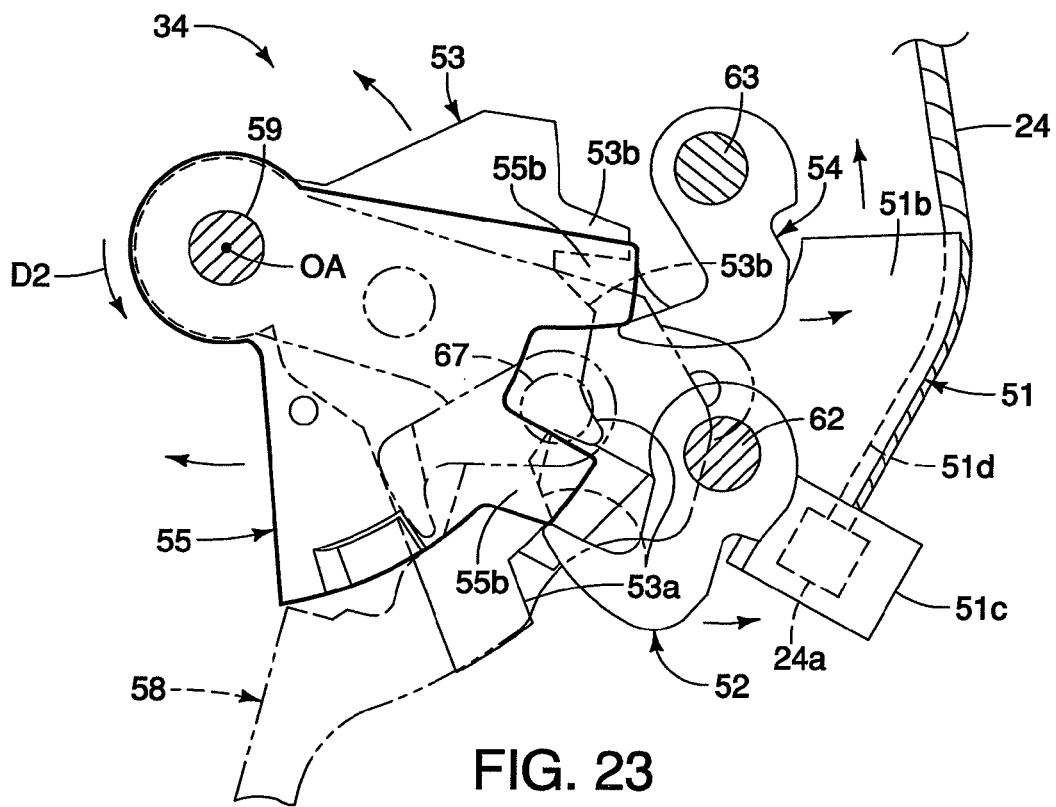
FIG. 23 is a simplified elevational view of selected parts of the shift control unit with the wire takeup member of the shift control unit being released to move to the fully released position.
Figure 24:
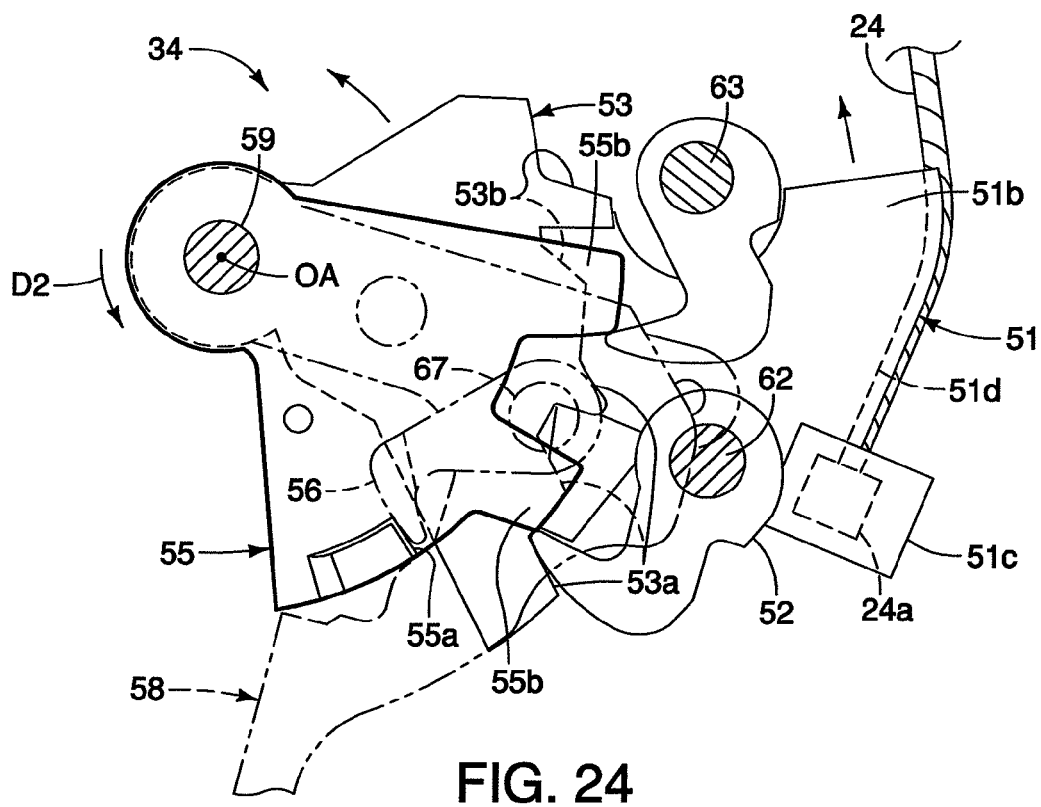
FIG. 24 is a simplified elevational view of selected parts of the shift control unit with the wire takeup member of the shift control unit moved to the fully released position, but with the second control member still in the shifting position.
Figure 25:
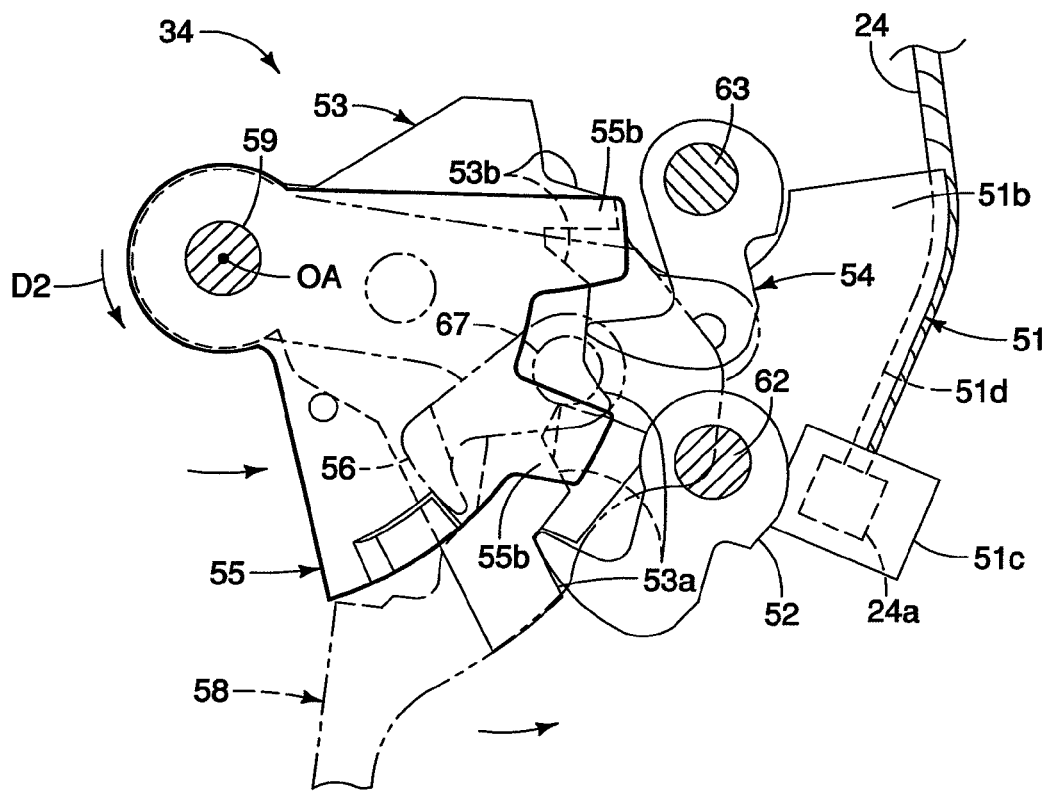
FIG. 25 is a simplified elevational view of selected parts of the shift control unit with the wire takeup member of the shift control unit in the fully released position, and the second control member and the release plate moving back to the rest positions.

When the second operating lever 42 and the second control member 58 are moved from their rest positions to their shifting positions to operate the shift control unit 34, the release pawl 56 rotates the release plate 55 so that the release abutments 55b selectively engage the wire pulling pawl 52 and the positioning pawl 54 to release the positioning plate 53 when the release plate 55 is rotated in the first operating direction D1 (see, FIGS. 22 and 23). Thus, the release plate 55 releases the wire takeup member 51 to rotates in the wire releasing direction D2 due to the urging force of the return spring or biasing element 65 and the cable tension in response to movement of the second operating lever 42 as seen in FIG. 24.

Preferably, as seen in FIGS. 15 and 16, the first control member 57 basically includes a first lever portion 71 and a second lever portion 72 pivotally mounted to the first lever portion 71. A hinge pin 73 pivotally interconnects the first and second lever portions 71 and 72 together. A biasing element 74 is mounted on the hinge pin 73 to urge the second lever portion 72 forwardly with respect to the first lever portion 71 to a rest position. This intermediate hinge between the first and second lever portions 71 and 72 allows the second lever portion 72 to pivot rearwardly with respect to the first lever portion 71 such as when the first operating lever 41 is operated from the rest (non-braking) position to the braking position as seen in FIG. 5.

The first lever portion 71 is operatively coupled to the shift control unit 34. The second lever portion 72 of the first control member 57 is located in the opening of the control member connecting part 41a of the first operating lever 41 to operatively couple the first operating lever 41 to the first control member 57. The first lever portion 71 of the first control member 57 is pivotally mounted to the shift unit axle 59 to pivot with the first operating lever 41.

In particular, the first lever portion 71 of the first control member 57 is pivotally connected to the shift control unit 34 about the main pivot or operating axis OA of the shift unit axle 59 to operate the shift control unit 34 when the first operating lever 41 is operated along the first shift operating plane or path P1. The second lever portion 72 contacts the rear surface of the first operating lever 41. Thus, the first operating lever 41 is slidably engaged with the second lever portion 72 of the first control member 57 such that the second lever portion 72 of the first control member 57 is moved when the first operating lever 41 is moved along the non-shift movement path BP with sliding contact therebetween. Thus, the first control member 57 is operatively coupled to the first operating lever 41 via a non-rigid (sliding) connection. During movement of the first operating lever 41 along the first shift operating plane or path P1, the first control member 57 is moved relative to the base member 36 to move the positioning plate 53 via the wire pulling pawl 52 to perform a wire pulling operation.

As seen in FIG. 17, the first lever portion 71 of the first control member 57 has an abutment 71a (side surface) for moving the second control member 58 when the first operating lever 41 is operated. Thus, the second control member 58 is operatively coupled to the first control member 57 via a non-rigid (sliding) connection. When the wire pulling operation is desired, the rider pushes the first operating lever 41 in a direction transverse to the non-shift (brake) movement plane or path BP of the first operating lever 41 along the first shift operating plane or path P1 from the rest position to the shifting position. This movement of the first operating lever 41 causes the first and second control members 57 and 58 to move therewith to operate the shift control unit 34 in a wire winding operation.

As seen in FIG. 15, the second operating lever 42 has an abutment 42c (side surface) for moving the second control member 58 when the second operating lever 42 is operated. Thus, the second control member 58 is operatively coupled to the second operating lever 42 via a non-rigid (sliding) connection. When the first and second operating levers 41 and 42 are pivoted together with the attachment member 40 to perform a braking operation, the second operating lever 42 slides along the second control member 58 such that the second control member 58 remains stationary.

As seen in FIG. 16, the second control member 58 is pivotally mounted to the shift unit axle 59. The second control member 58 is operatively arranged to rotate the positioning plate 53 about the operating axis OA of the shift unit axle 59 in the second operating direction D2 via movement of the release plate 55 by the operation of the second operating lever 42. In particular, the second control member 58 is mounted on the shift unit axle 59 by a connecting hole 81 located at one end. The other end of the second control member 58 has an abutment 82 (flange) that contacts the first control member 57 and the second operating lever 42. Thus, when either the first operating lever 41 or the second operating lever 42 is operated to perform shifting operation, the second control member 58 is also pivoted about the shift unit axle 59 to operate the shift control unit 34 in accordance with the operating lever that was operated.

The abutment 82 (flange) is also selectively connected by the second operating lever 42 when the second operating lever 42 is operated. When the wire releasing operation is desired, the rider pushes the second operating lever 42 along the second shift operating plane or path P2 from the rest position.

This movement of the second operating lever 41 causes the second operating lever 41 to contact the abutment 82 of the second control member 58, and thus, move the second control member 58 to perform a wire releasing operation of the shift control unit 34. In other words, the abutment 82 is disposed along an operating path of the second operating lever 42 such that the second control member 58 is moved to operate the shift control unit 34 in response to pivotal movement of the second operating lever 42 relative to the attachment member 40. Likewise, the abutment 82 is disposed along an operating path of the first operating lever 41 such that the second control member 58 is moved in response to pivotal movement of the first operating lever 41 relative to the attachment member 40.

A return spring or biasing element 90 is preferably operatively coupled between the second control member 58 and a mounting member 91 that is attached to the base member 36. In the illustrated embodiment, the return spring or biasing element 90 is a tension spring with one end fixed to the second control member 58 by a pin 92 and the other end fixed to the mounting member 91. The return spring or biasing element 90 applies an urging force to the second control member 58 to bias the second control member 58 to the rest position. Since the abutment 82 of the second control member 58 abuts against the first control member 57, the first control member 57 is held in its rest position by the biasing element 90. Also since the first control member 57 is connected to the first operating lever 41, which is held in its rest position by the positioning mechanism 47, the first and second control members 57 and 58 are further held in their rest positions.

Figure 26:
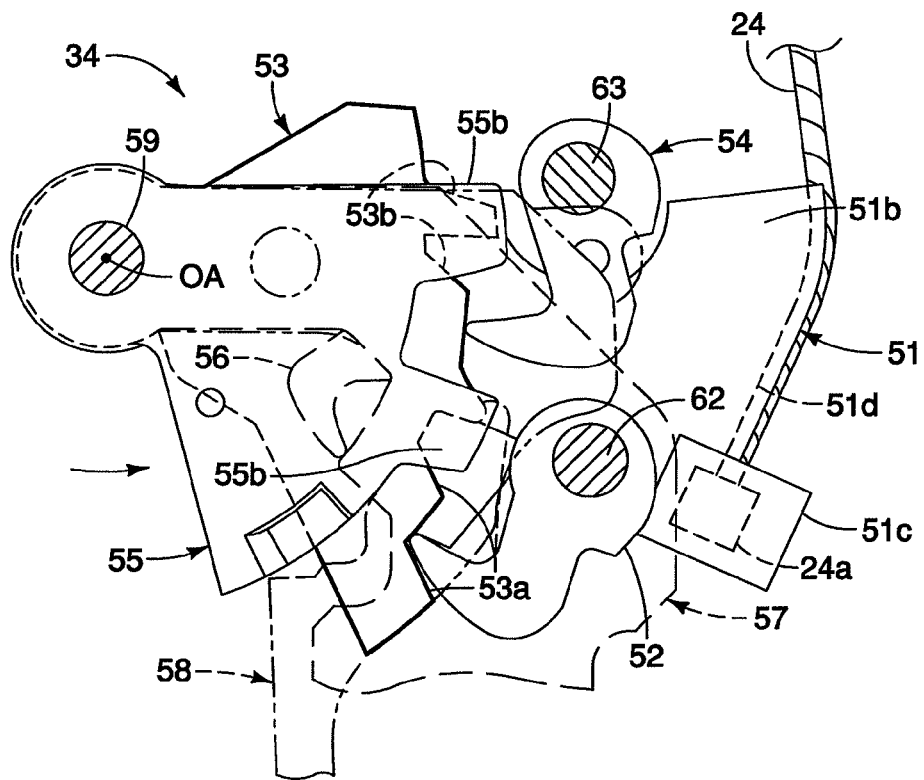
FIG. 26 is a simplified elevational view of selected parts of the shift control unit with the wire takeup member of the shift control unit in the fully released position, and the control member, the second control member and the release plate in the rest positions.
Figure 27:
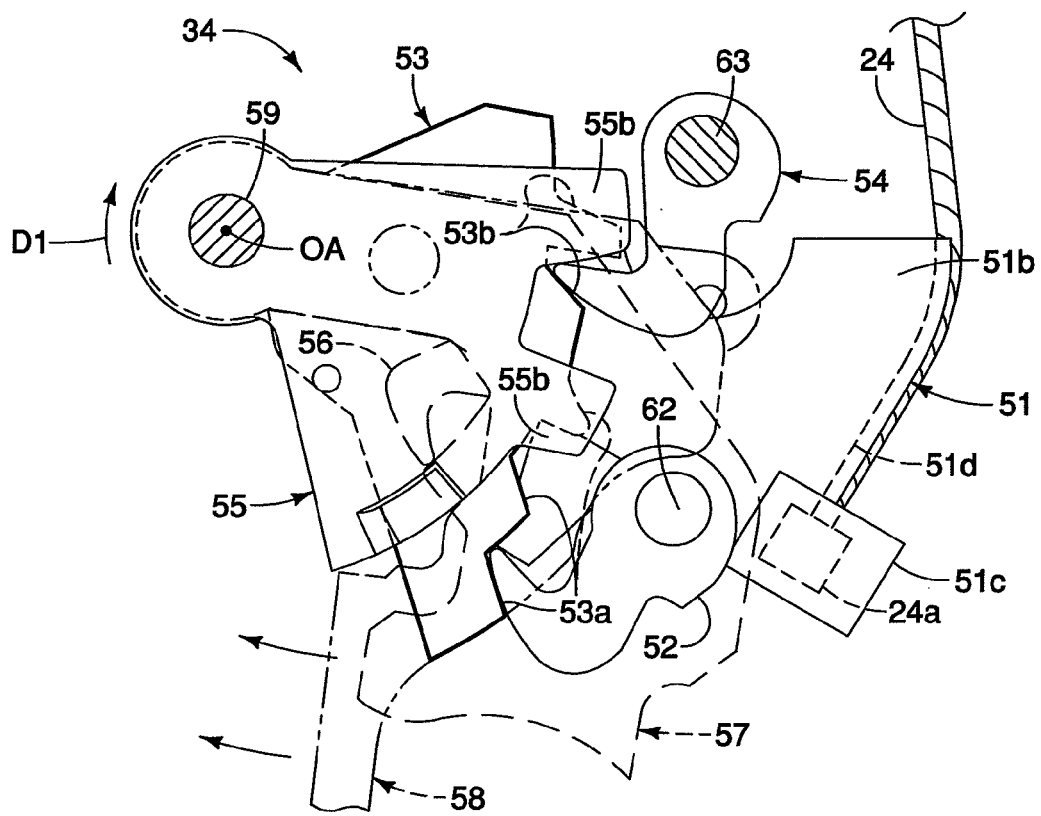
FIG. 27 is a simplified elevational view of selected parts of the shift control unit with the wire takeup member of the shift control unit in the fully released position, but with the first control member being initially moved from the rest position towards the shifting position.
Figure 28:
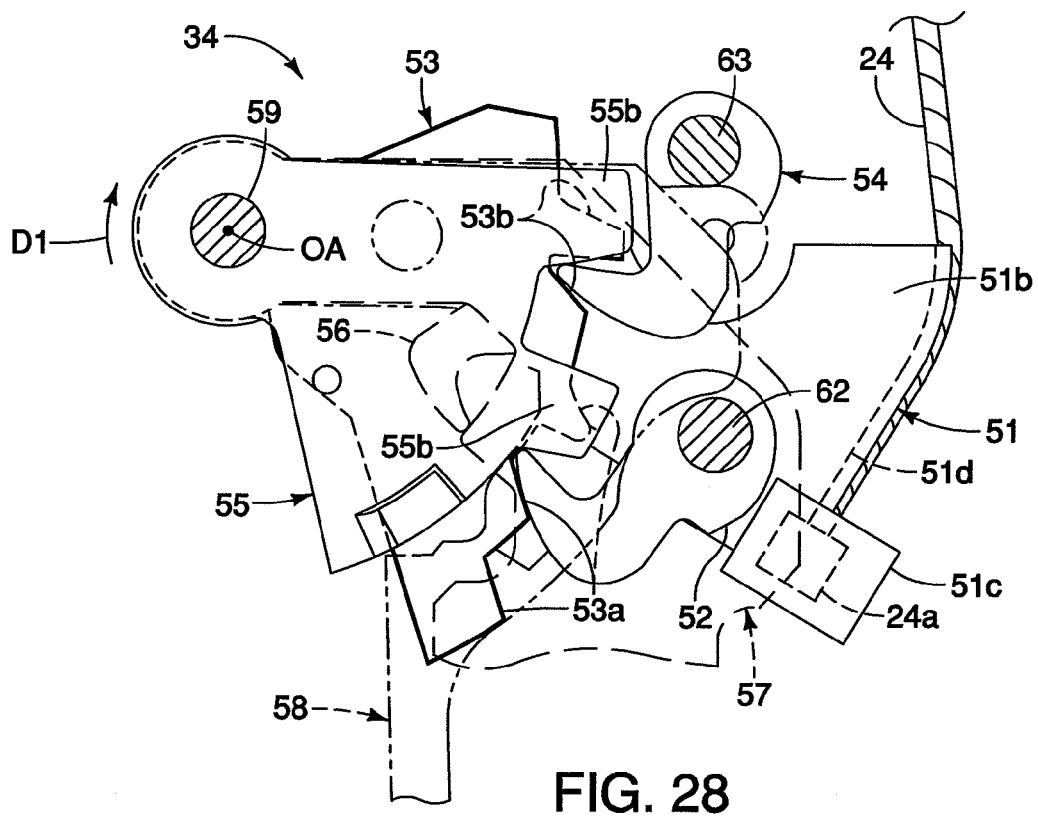
FIG. 28 is a simplified elevational view of selected parts of the shift control unit with the wire takeup member of the shift control unit in the fully released position, but with the first control member being moved from the rest position to the low trim position.
Figure 29:
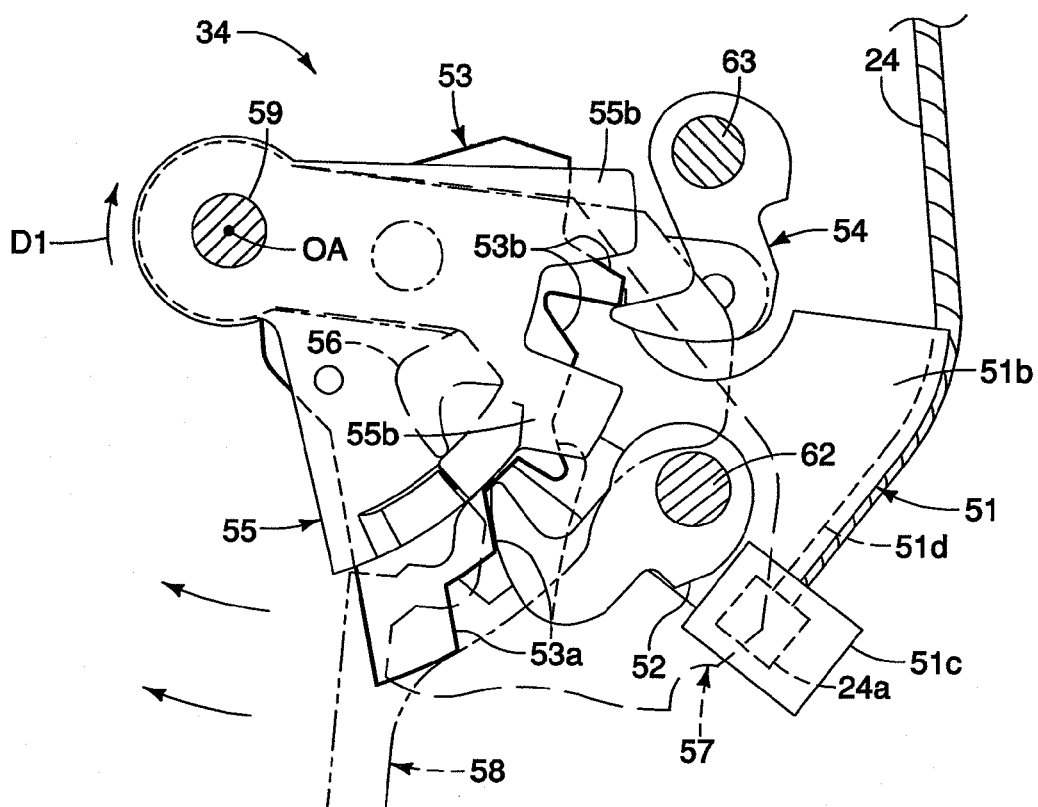
FIG. 29 is a simplified elevational view of selected parts of the shift control unit with the wire takeup member of the shift control unit in the low trim position, but with the first control member being moved from the rest position towards the shifting position such that the positioning pawl and the winding pawl both move out of engagement from the positioning plate to allow the positioning plate and the wire takeup member to be rotated towards the wire pulling position.
Figure 30:
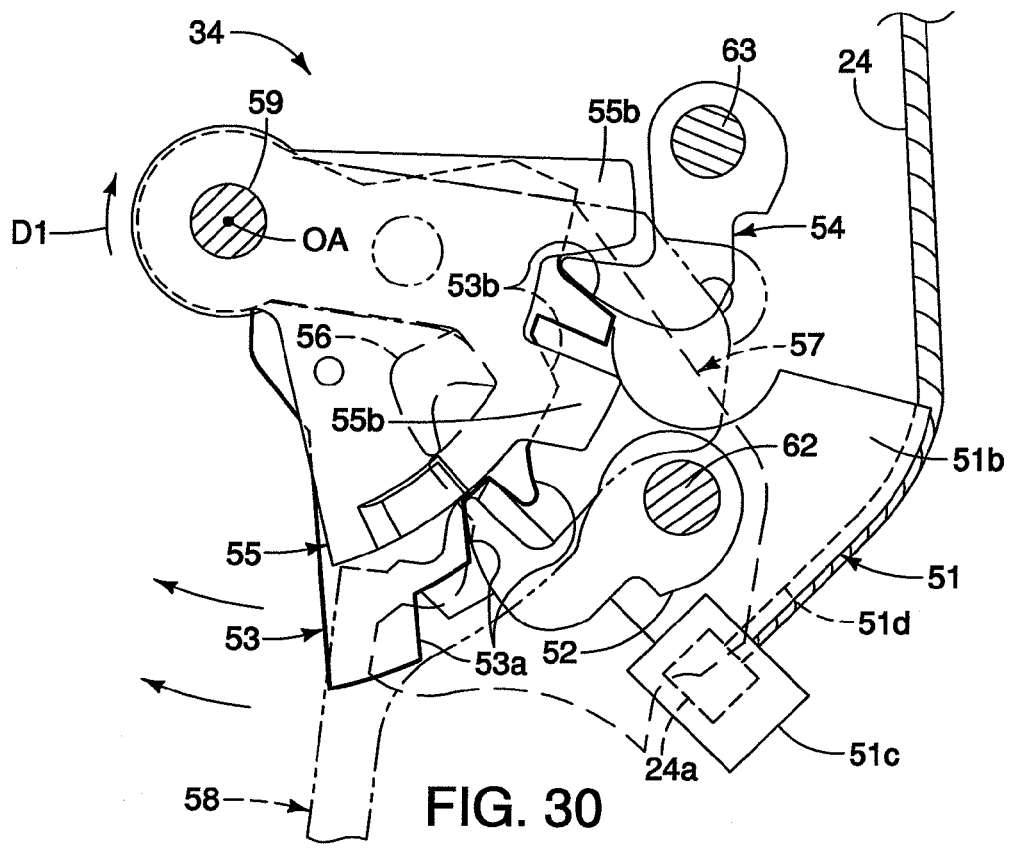
FIG. 30 is a simplified elevational view of selected parts of the shift control unit with the first control member being moved further from the position of FIG. 29 towards the shifting position such that the positioning pawl and the winding pawl both move back into engagement with the positioning plate to maintain the positioning plate and the wire takeup member in the fully pulled position.

FIGS. 17 to 25 illustrate an inner wire releasing operation, while FIGS. 26 to 31 illustrate an inner wire pulling operation. In the illustrated embodiment, the fully wire pulled position of FIG. 20 is a low gear position of the shift control unit 34 for holding the front derailleur 18 in a low gear position, while the fully wire released position of FIG. 26 is a top gear position of the shift control unit 34 for holding the front derailleur 18 in a top gear position. FIG. 28 illustrates a low gear trim position of the shift control unit 34 for holding the front derailleur 18 in a low gear trim position.

Figure 21:
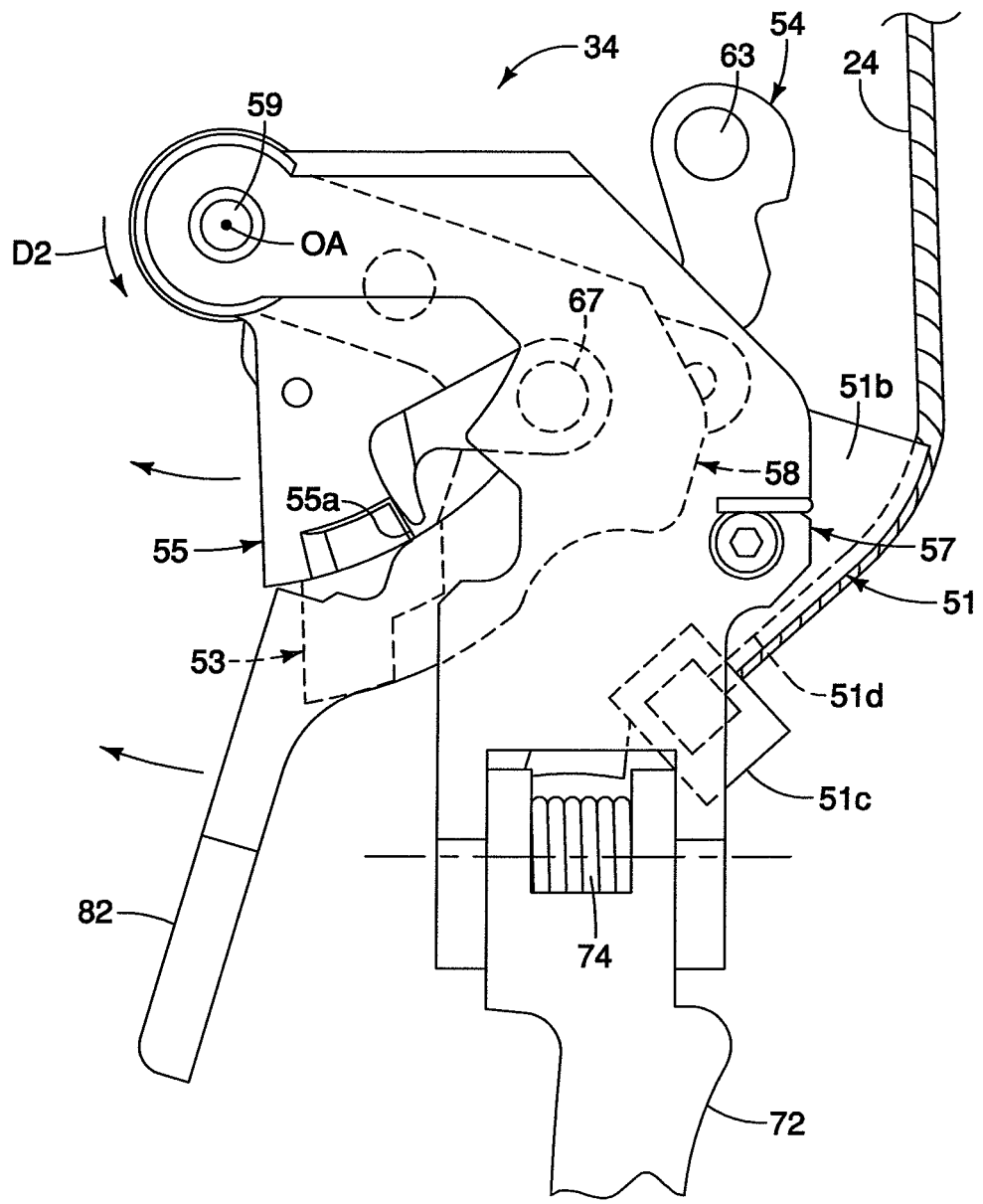
FIG. 21 is a simplified elevational view of selected parts of the shift control unit with the wire takeup member of the shift control unit being in the fully pulled position and the second control member being pivoted further from the position of FIG. 20 towards the shifting position such that the release plate moves with the second control member.

As seen in FIG. 20, the wire takeup member 51 of the shift control unit 34 is in the fully pulled position and the second control member 58 is being initially pivoted from the rest position towards the shifting position such that the release pawl 56 engages the driving abutment 55a of the release plate 55. As seen in FIG. 21, by pivoting the second control member 58 via the second operating lever 42 further from the position of FIG. 20 towards the shifting position, once the release pawl 56 engages the driving abutment 55a of the release plate 55, the release plate 55 now moves with the second control member 58. As seen in FIGS. 22 and 23, by pivoting the second control member 58 via the second operating lever 42 further from the position of FIG. 21 towards the shifting position, the winding pawl 52 and the positioning pawl 54 are both moved (pivoted) out of engagement from the positioning plate 53 to allow the positioning plate 53 and the wire takeup member 51 rotate towards the wire released position. As seen in FIG. 24, with the winding pawl 52 and the positioning pawl 54 both disengaged from the positioning plate 53 by the release abutments 55b, the wire takeup member 51 and the positioning plate 53 both move to the fully released position, with the second control member 58 still in the shifting position. As seen in FIGS. 21 and 22, when the second control member 58 is released, the second control member 58 and the release plate 55 moving back to their rest positions.

Figure 31:
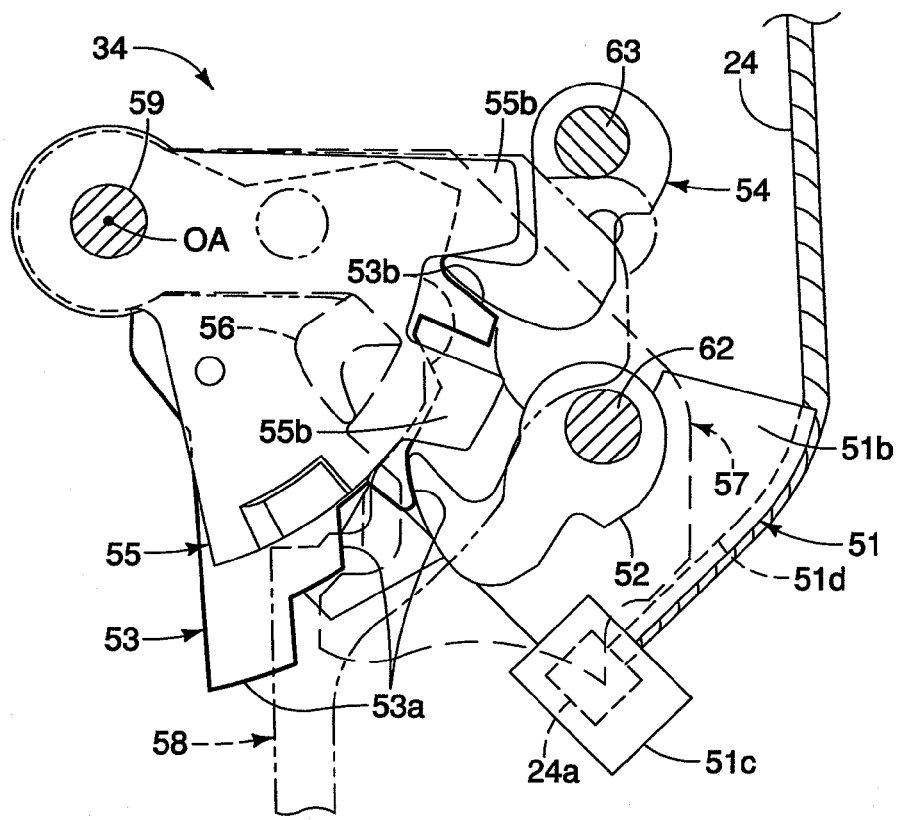
FIG. 31 is a simplified elevational view of selected parts of the shift control unit with the wire takeup member of the shift control unit in the fully pulled position, and the first and second control members moved back to the rest position.

In the case of a wire pulling operation, the first operating lever 41 is moved from the rest position to the shifting position which in turn moves the first control member 57, which is pivotally mounted to the shift unit axle 59. This pivotally movement of the first operating lever 41 to the shifting position causes the second operating lever 42 and the second control member 58 to pivot with the first operating lever 41. For the purpose of clarity, the movement of the first control member 57 will be shown in full lines and the movement of the second control member 58 will be illustrated in phantom lines in FIGS. 26 to 31. From the fully released position of FIG. 26, during an inner wire pulling operation, the first control member 57 is moved by the first operating lever 41 such that either a low gear trim position is attained by partial movement of the first control member 57 by the first operating lever 41 as seen in FIG. 27 or a top gear position is attained by complete or subsequent movement of the first control member 57 by the first operating lever 41 past the low gear trim position to the top gear position as seen in FIG. 31. As seen in FIG. 27, when the first control member 57 is initially moved from the rest position towards the shifting position, the winding pawl 52 engages one of the winding abutments 53a of the positioning plate 53 to rotate the positioning plate 53 and the wire takeup member 51 in the wire pulling direction. Also during this movement of the positioning plate 53, the positioning pawl 54 is pivoted to engage the low gear trim abutment of the positioning abutments 53b. The first operating lever 41 can now be release to attain the position in FIG. 28, if a low gear trim position is desired or moved further to attain the position in FIG. 31, if a top gear position is desired. Of course, the top gear position can also be attained from the low gear trim position as seen in FIGS. 28 to 31.

In the above discussed embodiment, the shift control unit 34 is illustrated as a cable operating shift control unit, which is merely one example of a shift control unit that can be used with the bicycle control device 14. In other words, the shift control unit for the bicycle control device 14 is not limited to a cable operating system, but rather other types of shift control units can be used with the bicycle control device 14 described and illustrated herein. For example, the shift control unit 34 can be replaced an electrical shift control unit, or a pneumatic shift control unit, or hydraulic shift control unit. In the case of an electrical shift control unit, at least a pair of electrical switches would be provided for performing upshift and downshift operations in response to selective movements of the first and second operating levers 41 and 42. In the case of a pneumatic shift control unit or hydraulic shift control unit, a valve system would be provided for performing upshift and downshift operations in response to selective movements of the first and second operating levers 41 and 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
   a base member including a handlebar mounting structure;
   a control unit mounted to the base member;
   an attachment member movably coupled to the base member;
   a first operating lever operatively coupled to the control unit, the first operating lever being coupled to the attachment member to move with the attachment member when the attachment member is moved relative to the base member, and the first operating lever being pivotally coupled to the attachment member to pivot relative to the attachment member about a first pivot axis to operate the control unit to perform a control unit operation; and
   a second operating lever operatively coupled to the control unit and pivotally coupled to the attachment member on a second pivot axis to operate the control unit differently from the control unit operation of the first operating lever in response to the second operating lever being pivoted on the second pivot axis relative to the attachment member, and the second operating lever pivoting on the second pivot axis relative to the attachment member in response to the first operating lever being pivoted on the first pivot axis relative to the attachment member.

2. The bicycle control device according to claim 1, wherein the attachment member includes a cable attachment structure.

3. The bicycle control device according to claim 1, wherein the second operating lever is independently pivotally coupled to the attachment member such that the first operating lever remains stationary in response to the second operating lever being pivoted relative to the attachment member.

4. The bicycle control device according to claim 1, wherein the control unit includes a control member operatively coupling the second operating lever to the control unit.

5. The bicycle control device according to claim 4, wherein the control member includes an abutment that is disposed along an operating path of the second operating lever such that the control member is moved to operate the control unit in response to pivotal movement of the second operating lever relative to the attachment member.

6. The bicycle control device according to claim 1, wherein the control unit includes a pair of control members operatively coupling the first and second operating levers to a shifting mechanism of the control unit, with the shifting mechanism being operated when the first and second operating levers are selectively pivoted relative to the attachment member and the shifting mechanism remains in a non-operating state when the attachment member is moved relative to the base member by the first operating lever.

7. The bicycle control device according to claim 1, wherein the control unit includes a first control member operatively coupled to the first operating lever, and a second control member operatively coupled to the second operating lever.

8. The bicycle control device according to claim 1, wherein the control unit includes a wire takeup member.

9. The bicycle control device according to claim 8, wherein the first and second operating levers are operatively coupled to the control unit to operate the control unit such that the wire takeup member rotates in a first rotational direction in response to operation of the first operating lever and the wire takeup member rotates in a second rotational direction in response to operation of the second operating lever, with the first and second rotational directions being opposite to each other.

10. The bicycle control device according to claim 9, wherein the attachment member includes a cable attachment structure.

11. The bicycle control device according to claim 1, wherein the first and second pivot axes are offset.

12. The bicycle control device according to claim 1, wherein the first operating lever is a brake lever that is pivotally mount about a third pivot axis, and the attachment member includes a brake cable attachment structure.

13. The bicycle control device according to claim 1, wherein the first and second operating levers have opposed abutments that are arranged with respect to each other such that the first operating lever moves with the second operating lever by the opposed abutments contacting each other in response to the first operating lever being pivoted about the first pivot axis relative to the attachment member.

14. The bicycle control device according to claim 1, wherein the attachment member includes a first pivot connection with the first operating lever and a second connection with the second operating lever.

15. The bicycle control device according to claim 1, wherein the second pivot axis of the second operating lever is offset from the first operating lever.

* * * * *